(12) United States Patent
Ortiz

(10) Patent No.: US 7,796,162 B2
(45) Date of Patent: Sep. 14, 2010

(54) PROVIDING MULTIPLE SYNCHRONIZED CAMERA VIEWS FOR BROADCAST FROM A LIVE VENUE ACTIVITY TO REMOTE VIEWERS

(75) Inventor: Luis M. Ortiz, Albuquerque, NM (US)

(73) Assignee: Front Row Technologies, LLC, Albuquerque, NM (US)

( * ) Notice: Subject to any disclaimer, the term of this patent is extended or adjusted under 35 U.S.C. 154(b) by 1050 days.

(21) Appl. No.: 10/620,098

(22) Filed: Jul. 14, 2003

(65) Prior Publication Data

US 2004/0032495 A1 Feb. 19, 2004

Related U.S. Application Data

(63) Continuation-in-part of application No. 09/708,776, filed on Nov. 8, 2000, now Pat. No. 7,149,549, application No. 10/620,098, which is a continuation-in-part of application No. 10/015,458, filed on Dec. 13, 2001, and a continuation-in-part of application No. 09/902,348, filed on Jul. 10, 2001.

(60) Provisional application No. 60/243,561, filed on Oct. 26, 2000.

(51) Int. Cl.
*H04N 5/232* (2006.01)

(52) U.S. Cl. .............. 348/211.8; 348/157; 348/208.14; 348/333.01; 348/376

(58) Field of Classification Search .............. 348/211.8, 348/211.1–211.3, 211.9–211.11, 207.1, 157, 348/169, 208.14, 333.01, 376
See application file for complete search history.

(56) References Cited

U.S. PATENT DOCUMENTS 4,183,056 A 1/1980 Evans et al.

(Continued)

FOREIGN PATENT DOCUMENTS

CA 2237939 C 9/1999

OTHER PUBLICATIONS

Ken Salzberg et al., "Intel's Immersive Sports Vision," Intel Corporation, Mar. 30, 2001.

(Continued)

*Primary Examiner*—Gevell Selby
(74) *Attorney, Agent, or Firm*—Kermit D. Lopez; Luis M. Ortiz; Ortiz & Lopez, PLLC

(57) ABSTRACT

A method and system for transmitting and displaying venue-based synchronized camera views for live venue activities to remote views. A synchronized camera can include a main camera and at least one slave camera, wherein slave camera movement depends on movement by the main camera. Views captured by a slave camera can be of the same general target as those captured by the main camera. Remote viewers can be venue-based hand held devices or distant monitors. Remote viewers can include hand held devices and digital entertainment monitors (e.g., HDTV). Within a venue, the camera views can be processed and formatted for display on display screens associated with venue-based hand held device. A user can select from more than one view from the synchronized camera that the user wants displayed on the remote viewer, thereby enabling a user of the hand held device to view more than one camera view, at a time or simultaneously, through the remote viewer.

62 Claims, 27 Drawing Sheets

U.S. PATENT DOCUMENTS

| | | | |
|---|---|---|---|
| 4,994,909 A | 2/1991 | Graves et al. | |
| 5,164,827 A * | 11/1992 | Paff | 348/211.9 |
| 5,243,425 A | 9/1993 | Vance | 358/86 |
| 5,295,180 A | 3/1994 | Vendetti et al. | |
| 5,413,345 A | 5/1995 | Nauck | |
| 5,422,816 A | 6/1995 | Sprague et al. | |
| 5,448,291 A | 9/1995 | Wickline | 348/159 |
| 5,485,504 A | 1/1996 | Ohnsorge | 379/58 |
| 5,513,384 A | 4/1996 | Brennan et al. | |
| 5,546,538 A | 8/1996 | Cobbley et al. | |
| 5,585,850 A | 12/1996 | Schwaller | 348/388 |
| 5,598,208 A | 1/1997 | McClintock | |
| 5,600,368 A | 2/1997 | Matthews et al. | 348/143 |
| 5,613,191 A | 3/1997 | Hylton et al. | 455/3.1 |
| 5,627,915 A | 5/1997 | Rosser et al. | 382/219 |
| 5,663,717 A | 9/1997 | DeLuca | |
| 5,689,549 A | 11/1997 | Bertocci et al. | |
| 5,708,961 A | 1/1998 | Hylton et al. | 455/4.2 |
| 5,729,471 A | 3/1998 | Jain et al. | |
| 5,758,088 A | 5/1998 | Bezaire et al. | |
| 5,760,824 A | 6/1998 | Hicks, III | 348/14 |
| 5,760,848 A | 6/1998 | Cho | |
| 5,768,151 A * | 6/1998 | Lowy et al. | 348/157 |
| 5,793,416 A | 8/1998 | Rostoker et al. | 348/17 |
| 5,797,089 A | 8/1998 | Nguyen | |
| 5,806,005 A | 9/1998 | Hull et al. | 455/566 |
| 5,808,695 A | 9/1998 | Rosser et al. | 348/584 |
| 5,812,819 A | 9/1998 | Rodwin et al. | |
| 5,822,324 A | 10/1998 | Kostresti et al. | |
| 5,841,122 A | 11/1998 | Kirchhoff | 235/492 |
| 5,847,612 A | 12/1998 | Birleson | 331/2 |
| 5,847,762 A | 12/1998 | Canfield et al. | 348/415 |
| 5,878,211 A | 3/1999 | Delagrange et al. | |
| 5,892,554 A | 4/1999 | DiCicco et al. | 348/584 |
| 5,894,320 A | 4/1999 | Vancelette | 348/7 |
| 5,920,701 A | 7/1999 | Miller et al. | |
| 5,933,773 A | 8/1999 | Barvesten | |
| 5,946,635 A | 8/1999 | Dominguez | |
| D413,881 S | 9/1999 | Ida et al. | |
| 5,953,076 A | 9/1999 | Astle et al. | 348/584 |
| 5,959,539 A | 9/1999 | Adolph et al. | |
| 5,963,056 A | 10/1999 | Tucker | |
| 5,979,757 A | 11/1999 | Tracy et al. | |
| 5,982,445 A | 11/1999 | Eyer et al. | 348/461 |
| 5,990,958 A | 11/1999 | Bheda et al. | 348/407 |
| 5,991,498 A | 11/1999 | Young | |
| 5,999,808 A | 12/1999 | LaDue | 455/412 |
| 6,002,720 A | 12/1999 | Yurt et al. | 375/240 |
| 6,002,995 A | 12/1999 | Suzuki et al. | 702/188 |
| 6,009,336 A | 12/1999 | Harris et al. | 455/566 |
| 6,016,348 A | 1/2000 | Blatter et al. | 380/5 |
| 6,034,621 A | 3/2000 | Kaufman | |
| 6,034,716 A | 3/2000 | Whiting et al. | 348/36 |
| 6,043,837 A | 3/2000 | Driscoll, Jr. et al. | 348/36 |
| 6,064,860 A | 5/2000 | Ogden | 455/66 |
| D426,527 S | 6/2000 | Sakaguchi | D14/126 |
| 6,073,171 A | 6/2000 | Gaughan et al. | |
| 6,078,954 A | 6/2000 | Lakey et al. | 709/223 |
| 6,095,423 A | 8/2000 | Houdeau et al. | 235/487 |
| 6,100,925 A | 8/2000 | Rosser et al. | 348/169 |
| 6,104,414 A | 8/2000 | Odryna et al. | 345/909 |
| 6,121,966 A | 9/2000 | Teodosio et al. | 345/346 |
| 6,124,862 A | 9/2000 | Boyken et al. | 345/435 |
| 6,128,143 A | 10/2000 | Nalwa | 359/725 |
| 6,131,025 A | 10/2000 | Riley et al. | 455/414 |
| 6,133,946 A | 10/2000 | Cavallaro et al. | 348/135 |
| 6,137,525 A | 10/2000 | Lee et al. | 348/14 |
| 6,144,402 A | 11/2000 | Norsworthy et al. | |
| 6,144,702 A | 11/2000 | Yurt et al. | 375/240.01 |
| 6,154,250 A * | 11/2000 | Honey et al. | 348/157 |
| 6,167,092 A | 12/2000 | Lengwehasatit | 375/240.2 |
| 6,169,568 B1 | 1/2001 | Shigetomi | |
| 6,192,257 B1 | 2/2001 | Ray | 455/566 |
| 6,204,843 B1 | 3/2001 | Freeman et al. | 345/327 |
| 6,215,484 B1 | 4/2001 | Freeman et al. | 345/327 |
| 6,222,937 B1 | 4/2001 | Cohen et al. | 382/154 |
| 6,227,974 B1 | 5/2001 | Eilat et al. | 463/40 |
| 6,252,586 B1 | 6/2001 | Freeman et al. | 345/321 |
| 6,256,019 B1 | 7/2001 | Allport | 345/169 |
| 6,269,483 B1 | 7/2001 | Broussard | |
| 6,271,752 B1 | 8/2001 | Vaios | |
| 6,289,464 B1 | 9/2001 | Wecker et al. | |
| 6,295,094 B1 | 9/2001 | Cuccia | 348/559 |
| 6,317,776 B1 | 11/2001 | Broussard et al. | |
| 6,400,264 B1 | 6/2002 | Hsieh | |
| 6,405,371 B1 | 6/2002 | Oosterhout et al. | |
| 6,424,369 B1 | 7/2002 | Adair et al. | |
| 6,434,403 B1 | 8/2002 | Ausems et al. | 455/556 |
| 6,434,530 B1 | 8/2002 | Sloane et al. | |
| 6,442,637 B1 | 8/2002 | Hawkins et al. | |
| 6,456,334 B1 | 9/2002 | Duhault | |
| 6,466,202 B1 | 10/2002 | Suso et al. | 345/169 |
| 6,522,352 B1 | 2/2003 | Strandwitz et al. | 348/211.2 |
| 6,525,762 B1 | 2/2003 | Milski et al. | 348/81 |
| 6,526,335 B1 | 2/2003 | Treyz et al. | |
| 6,535,493 B1 | 3/2003 | Lee et al. | 370/329 |
| 6,560,443 B1 | 5/2003 | Vaisanen et al. | |
| 6,564,070 B1 | 5/2003 | Nagamine et al. | 455/556 |
| 6,570,889 B1 | 5/2003 | Stirling-Gallacher et al. | 370/479 |
| 6,578,203 B1 * | 6/2003 | Anderson et al. | 348/157 |
| 6,579,203 B2 | 6/2003 | Wang et al. | |
| 6,602,191 B2 | 8/2003 | Quy | |
| 6,608,633 B1 | 8/2003 | Sciammarella et al. | |
| 6,624,846 B1 | 9/2003 | Lassiter | |
| 6,647,015 B2 | 11/2003 | Malkemes et al. | |
| 6,657,654 B2 * | 12/2003 | Narayanaswami | 348/207.1 |
| 6,669,346 B2 | 12/2003 | Metcalf | |
| 6,675,386 B1 | 1/2004 | Hendricks et al. | |
| 6,681,398 B1 | 1/2004 | Verna | |
| 6,714,797 B1 | 3/2004 | Rautila | |
| 6,728,518 B1 | 4/2004 | Scrivens et al. | |
| 6,731,940 B1 | 5/2004 | Nagendran | |
| 6,754,509 B1 | 6/2004 | Khan et al. | |
| 6,757,262 B1 | 6/2004 | Weisshaar et al. | |
| 6,766,036 B1 * | 7/2004 | Pryor | 348/169 |
| 6,782,102 B2 | 8/2004 | Blanchard et al. | |
| 6,813,608 B1 | 11/2004 | Baranowski | |
| 6,912,513 B1 | 6/2005 | Candelore | |
| 6,931,290 B2 | 8/2005 | Forest | |
| 6,934,510 B2 | 8/2005 | Katayama | |
| 6,970,183 B1 | 11/2005 | Monroe | |
| 6,986,155 B1 | 1/2006 | Courtney et al. | |
| 7,124,425 B1 | 10/2006 | Anderson, Jr. et al. | |
| 7,149,549 B1 | 12/2006 | Ortiz et al. | |
| 7,162,532 B2 | 1/2007 | Koehler et al. | |
| 7,196,722 B2 | 3/2007 | White et al. | |
| 7,376,388 B2 | 5/2008 | Ortiz et al. | |
| 2001/0040671 A1 | 11/2001 | Metcalf | 353/94 |
| 2001/0042105 A1 | 11/2001 | Koehler et al. | |
| 2001/0045978 A1 | 11/2001 | McConnell et al. | |
| 2002/0018124 A1 | 2/2002 | Mottur et al. | |
| 2002/0058499 A1 | 5/2002 | Ortiz | |
| 2002/0069419 A1 | 6/2002 | Raverdy et al. | |
| 2002/0115454 A1 | 8/2002 | Hardacker | |
| 2002/0188943 A1 * | 12/2002 | Freeman et al. | 348/157 |
| 2003/0041334 A1 | 2/2003 | Lu | |
| 2003/0105845 A1 | 6/2003 | Leermakers | |
| 2005/0060751 A1 | 3/2005 | Glaser | |
| 2006/0170778 A1 | 8/2006 | Ely et al. | |

2007/0129817 A1    6/2007   Cadiz et al.

OTHER PUBLICATIONS

Richard Alm, "New Arena a Technical Marvel," The Dallas Morning News, Oct. 15, 2000. pp. 1-6.
"ChoiceSeat, Live Interactive Event Entertainment," www.choiceseat.com, Oct. 15, 2000 pp. 1-5.
"Unstrung: The Birth of the Wireless Internet," CIBC World Markets, Equity Research, Oct. 4, 2000, pp. 1-140.
Brian Bergstein, "Click Me Out to the Ballgame, Web-Wired Stadiums Aim to Spur Evolution of Spectator Sports," Las Vegas Review Journal, Online Edition, Oct. 20, 2000, pp. 1-4.
Stephanie Sanborn, "Armchair Quarterbacks go Wireless at 3Com Park"; InfoWorld, Sep. 29, 2000, pp. 1-2.
"Peanuts, popcorn and a PC at the old ballpark," www.king5.com, Sep. 28, 2000, pp. 1-4.
Brigan Bergstein, "Having a Ball with Technology, High-Tech Firms Teaming up with Pro Sports Venues," www.abcnews.com, Sep. 27, 2000, pp. 1-2.
Wu et al., "On End-to-End Architecture for Transporting MPEG-4 Video over the Internet"; IEEE Transaction on Circuits and Systems for Video Technology, vol. 10, No. 6, pp. 1-18, Sep. 2000.
"3Com: Don't Get Up, Sports Fans," USA Today, Tech Report, Aug. 22, 2000, pp. 1-2.
Scott Boyter, "Product likely to be home run with sports fans," DFW TechBiz, Aug. 21, 2000, pp. 1-3.
David Camoy, "LG TP3000"; CNET Wireless, Aug. 17, 2000, pp. 1-2.
"SGI at the Pepsi Center"; Silicon Graphics, Inc.; Jul. 2000, pp. 1-2.
"Wireless Dimensions Corporation Adds to Mobile-Venue Suite™"; Press Release, Wireless Dimensions; Allen, Texas; Jul. 26, 2000; http://www.wirelessdimensions.net/news.html, pp. 1-2.
"Wireless Dimensions Corporation Unveils Mobile-Venue Suite™"; Press Release, Wireless Dimensions; Allen, Texas; Jun. 19, 2000; http://www.wirelessdimensions.net/news.html, pp. 2-3.
"Contactless Applications for PDAs"; Inside Technologies, Cartes 2000, Aug. 2000, pp. 1-14.
"Seeing is Believing—Motorola and Packetvideo Demonstrate MPEG-4 Video over GPRS," Press Release, Packetvideo, May 10, 2000, pp. 1-3.
"IEEE 802.11b Wireless LANs," 3COM Technical Paper, Apr. 25, 2000, pp. 1-3, pp. 1-13.
Capin et al., "Efficient Modeling of Virtual Humans in MPEG-4"; 0-7803-6536-4/00, IEEE 2000, pp. 1-4.
W.A. Adamson et al., "Secure Distributed Virtual Conferencing: Multicast or Bust"; CITI Technical Report 99-1, Center for Information Technology Integration, University of Michigan, Ann Arbor, Jan. 25, 1999, pp. 1-7.
N.T. Trask et al., "Smart Cards in Electronic Commerce"; BT Technol J. vol. 17, No. 3, Jul. 1999, pp. 57-66.
Battista et al., "MPEG-4: A Multimedia Standard for the Third Millenium, Part 1"; 1070-986X/99, IEEE 1999. pp. 74-83.
"Fiber Optic Video/Audio/Intercom/Data System," Telecast Fiber Systems, Inc., pp. 1-4.
Thomas Lauterbach & Matthias Unbehaun, "Multimedia Environment for Mobiles (MEMO)—Interactive Mutimedia Services to Portable and Mobile Terminals," Robert Bosch Multimedia-Systems GmbH & Co., KG., Hildesheim, Germany, 1997, pp. 1-6.

* cited by examiner

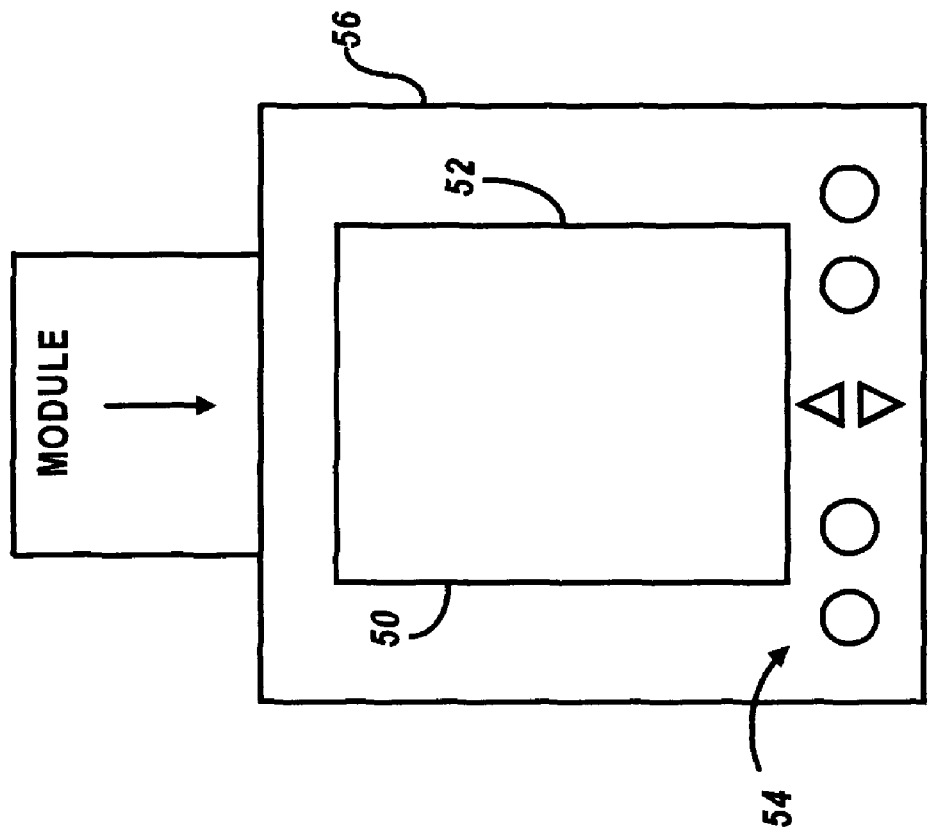
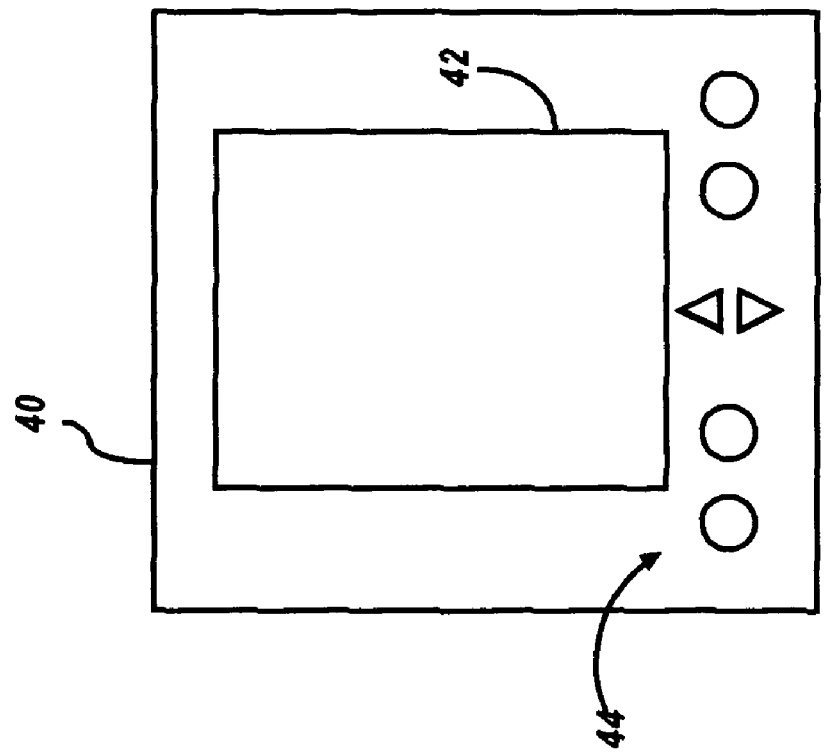

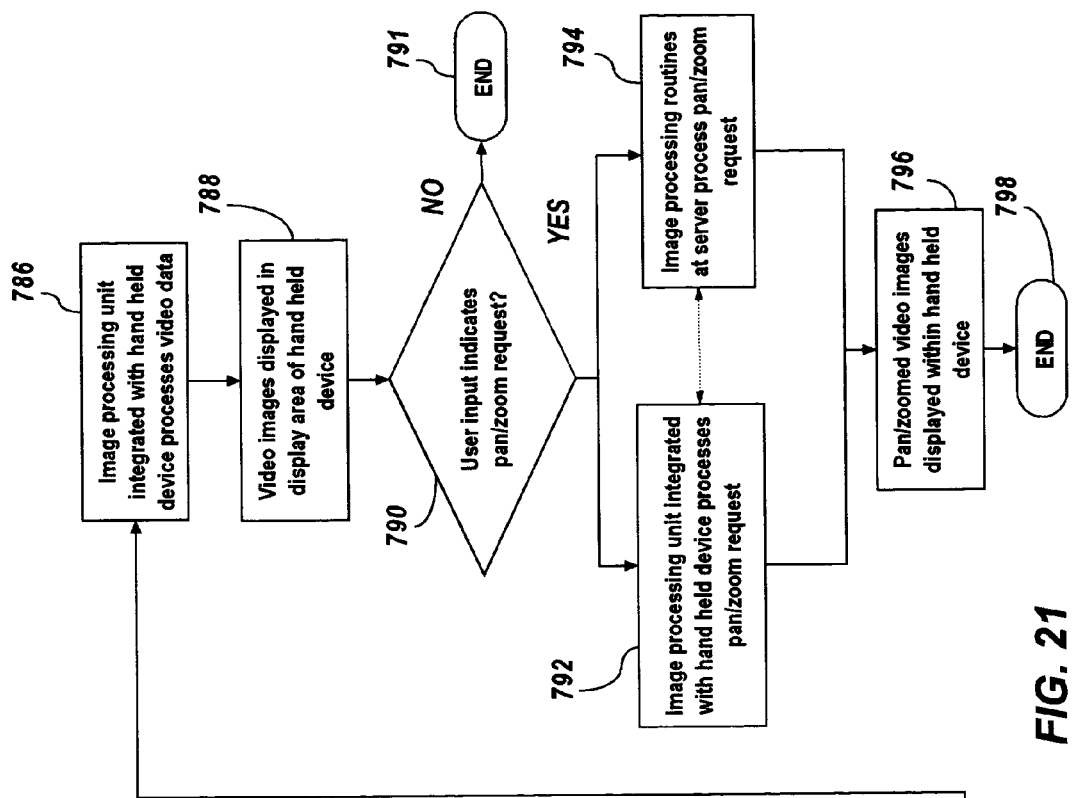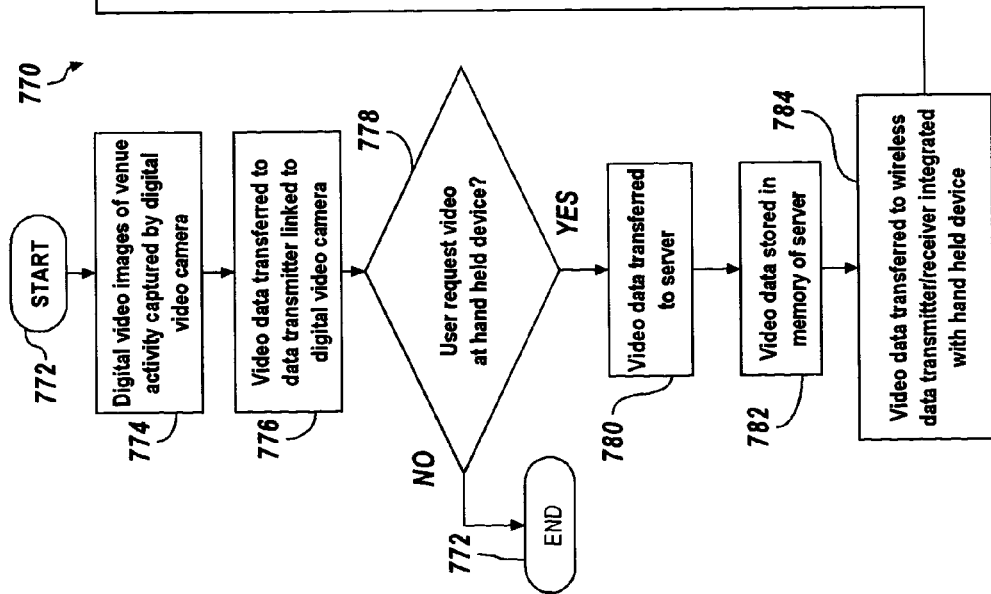
FIG. 21

PROVIDING MULTIPLE SYNCHRONIZED CAMERA VIEWS FOR BROADCAST FROM A LIVE VENUE ACTIVITY TO REMOTE VIEWERS

CROSS-REFERENCE TO RELATED APPLICATIONS

This application is a continuation-in-part of U.S. patent application Ser. No. 09/708,776, entitled "Providing Multiple Perspectives for a Venue Activity Through an Electronic Hand Held Device, filed Nov. 8, 2000 now U.S. Pat. No. 7,149,549, which was a non-provisional of a provisional patent application Ser. No. 60/243,561, entitled "Providing Multiple Perspectives for a Venue Activity Through an Electronic Hand Held Device," filed Oct. 26, 2000. This application is also a continuation-in-part of U.S. patent application Ser. No. 09/902,348, entitled "Providing Multiple Perspectives of a Venue Activity to Electronic Wireless Hand Held Devices," filed Jul. 10, 2001, which was also a non-provisional of the provisional patent application Ser. No. 60/243, 561, entitled "Providing Multiple Perspectives for a Venue Activity Through an Electronic Hand Held Device," filed Oct. 26, 2000. This application is additionally a continuation-in-part of U.S. patent application Ser. No. 10/015,458, "Wireless Transmission of In-Play Camera Views to Hand Held Devices," filed Dec. 13, 2001. The contents of the aforementioned U.S. patent application Ser. Nos. 09/708,776, 09/902, 348, and 10/015,458 are incorporated, herein, in their entirety, by reference.

TECHNICAL FIELD

The present invention is related to wireless electronic hand held devices, such as Personal Digital Assistants (PDAs), hand held televisions, and data-enabled wireless telephones. The present invention also relates to techniques for remotely delivering video-related data to hand held devices. In addition, the present invention relates to techniques for providing increased viewing opportunities for audiences in venue environments, such as stadiums and concert arenas. Additionally, the present invention relates to wireless video data transmission to hand held devices.

BACKGROUND OF THE INVENTION

Most modern stadiums and live entertainment facilities or arenas (herein also collectively referred to as "venues"), which feature sporting events and concerts, typically employ large television screens that receive video images and are linked within the stadium to a plurality of television cameras positioned to capture video images at diverse locations within the stadium. The audience at a typical sporting event, for example, can view advertisements, instant replays, and other sports related data on the large television screens within the sports stadium itself. Feeds can be additionally generally provided from the cameras to announcers in a broadcast booth, replaying certain plays from the event so that announcers can make comments about plays, and finally transmitting a telecast to the viewing audience, including some aspects of captured video and data to the stadium audience.

Despite the availability of such large screen television monitors, venue event audience members still lack enhanced viewing options or perspectives within the venue itself. To compensate for the lack of viewing options, sports and concert promoters often rent binoculars to audience members prior to or during the event. Such binoculars can permit the typical audience member to obtain a somewhat better, but limited, view of the event, such as a football or hockey game, but even these views are often obstructed by other audience members and are tied to only one perspective.

The large television screens placed in a venue such as a stadium are typically linked to cameras that are fixed or mobile. Placement of cameras about the stadium or arena is generally tied to an enterprise system. The movement of the game ball in a football game, for example, along with the players on the field is dynamic and unpredictable, and may not always be caught by the active camera having the best perspective. Thus, during a game, the large television screens typically provide only one view, which can be further obstructed by other players or officials, often destroying a critical angular view.

In addition, such large screens are often utilized to bombard audience members with information, such as advertisements, thereby cutting into venue activity video that venue audience members might otherwise wish to view such as instant replays, a current play or other event data. The audience members, therefore, essentially view the large screen at the behest of the camera operator or director and cannot select their own views or camera angles.

Based on the foregoing, the present inventors have found that such limitations in venue environments can be solved through the use of hand held devices, such as PDAs, hand held televisions, data/video-enabled cellular telephones, and other hand held wireless video-enabled devices. For example, the recent shift in the consumer electronics industry from an emphasis on analog technology to a preference for digital technology is largely based on the fact that the former generally limits the user to a role of a passive recipient of information, while the latter is interactive and allows the user to control what, when, and how he or she receives and manipulates certain information. This shift in focus has resulted in the development and increasingly widespread use of a digital device generically referred to as a "personal digital assistant" (PDA).

Hand held computing devices (i.e., hereinafter referred to as "hand held devices" or "handheld devices") are becoming increasingly popular for storing and maintaining information. Although PDAs may be connected to a desktop personal computer or other PDAs via infrared, direct wire, or wireless communication links, PDAs and similar hand held devices, can be linked to remote networks, such as the Internet, or local wireless resources, such as RF broadcasts, through available wireless communications techniques.

The most advanced data- and video-enabled wireless communication devices currently available in the marketplace take the form of a PDA (e.g., Palm Pilot™, Handspring Treo™, Windows CE compatible hand held computers, and gaming devices such as the GameBoy™). Unlike personal computers, which are general-purpose devices geared toward refining and processing information, PDAs are designed to capture, store and display information originating from various sources. Additionally, while a certain level of skill is required to use a personal computer effectively, PDAs are designed with the novice and non-computer user in mind.

Attempts have been made to provide venue-based, interactive entertainment to enhance the fan experience at live events. Such attempts utilize touch-screen technology integrated directly into seats at outdoor or indoor arenas. Audience members, however, due to their integration with the viewer seat, can easily damage such devices. Systems that incorporate such devices are also expensive because they literally require miles of cable.

Some recently constructed arenas, for example, that implement such seat-integrated technology are requiring hundreds of miles of electronic cabling, including audiovisual, broadcast, and multi-band lines. Such a plethora of large cables are expensive and require extra space, which often cannot be found in older stadiums, or would require a greater expense to integrate into newly built stadiums. The cost of retrofitting an older stadium with such technology can be staggering. Additionally, many fans that attend games or concerts with such technology integrated directly into the seats may find such a feature distracting.

Another problem faced by venue promoters and arena owners who integrate fixed technology directly into the seat is that such technology can quickly become obsolete. If a new facility is fitted with such electronic/hardware intensive technology, the technology may become quickly outdated, requiring an expensive update and/or retrofit.

The present inventors thus realize that a solution to these problems lies in the use of wireless hand held devices. By utilizing modern technology integrated with hand held devices, on-demand live action, multiple camera angles, instant replays, and real-time team, player, event and venue information may each be readily provided to fans without the expense and problems associated with present in-seat integrated technical environments. Additionally, it is anticipated that the deployment of venue-based systems facilitating the use of such devices would be relatively inexpensive, at least in comparison to seat-integrated systems. Finally, such systems will provide the venue attendee with increased mobility and freedom of use within and throughout the venue environment.

SUMMARY OF THE INVENTION

One aspect of the present invention provides improved methods and systems for delivering venue-related data to a hand held device.

It is another aspect of the present invention to provide improved methods and systems for delivering video provided at an entertainment venue to a hand held device.

It is still another aspect of the present invention to provide methods and systems for providing multiple perspectives from a venue activity for viewing through a hand held device.

It is yet another aspect of the present invention to provide hand held devices and associated methods that provide on-demand video action and instant replays from multiple camera angles focused on an entertainment venue activity.

It is still another aspect of the present invention to provide hand held devices and associated methods that provide on-demand video action and instant replays from one or more cameras focused on a venue activity.

It is yet another aspect of the present invention to provide in-play camera views for broadcast to hand held devices, including on-demand video action and instant replays from one or more cameras focused on a venue activity through a wireless communications network.

It is yet another aspect of the present invention to provide views from more than one synchronized camera deployed around performance environment (e.g., boxing ring or concert stage) for broadcast to hand held devices through a wireless communications network.

It is yet another aspect of the present invention to provide in-play camera views (e.g., auto racing, golf) for broadcast through a wireless communications network for remote use.

It is yet another aspect of the present invention to provide views from more than one synchronized camera deployed around performance environment (e.g., boxing, wresting or martial arts ring, or concert stage) for broadcast through a wireless communications network for remote use The above and other aspects of the invention can be achieved as will now be further described. A method and system is disclosed herein for transmitting and displaying venue-based camera views transmitted to hand held devices or broadcast to remote viewing monitors from more than one synchronized camera located about or within a contact sports (e.g., boxing, wresting, martial arts) arena or performance stage within a venue.

The in-play camera view may be processed for display on a display screen associated with a remote viewer or remote viewing device. Thereafter, the in-play camera view can be displayed on a display screen associated with the remote viewer, thereby enabling a user of the remote viewing device to selectively view the synchronized and/or in-play camera views. The camera views can be displayed at the remote viewer in response to user input.

In addition, a particular synchronized or in-play camera view captured by at least one camera can be recorded, in response to a particular user input the remote viewer or by enterprise equipment. Such an in-play camera view can also be stored in a memory of the remote viewer or within storage media (e.g., a memory stick or memory disk or other storage media), in response to user input.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of illustrative embodiments when read in conjunction with the accompanying drawings, wherein:

FIG. 2 illustrates a pictorial representation of a hand held device, which may be utilized to implement embodiments of the present invention;

FIG. 3 depicts a pictorial representation of a hand held device adapted for receiving a module in accordance with embodiments of the present invention;

FIG. 21 illustrates a flowchart of operations illustrative of a method for providing multiple venue activities through a hand held device from one or more digital video cameras in accordance with embodiments of the present invention;

DETAILED DESCRIPTION OF PREFERRED EMBODIMENT

Figure 1:
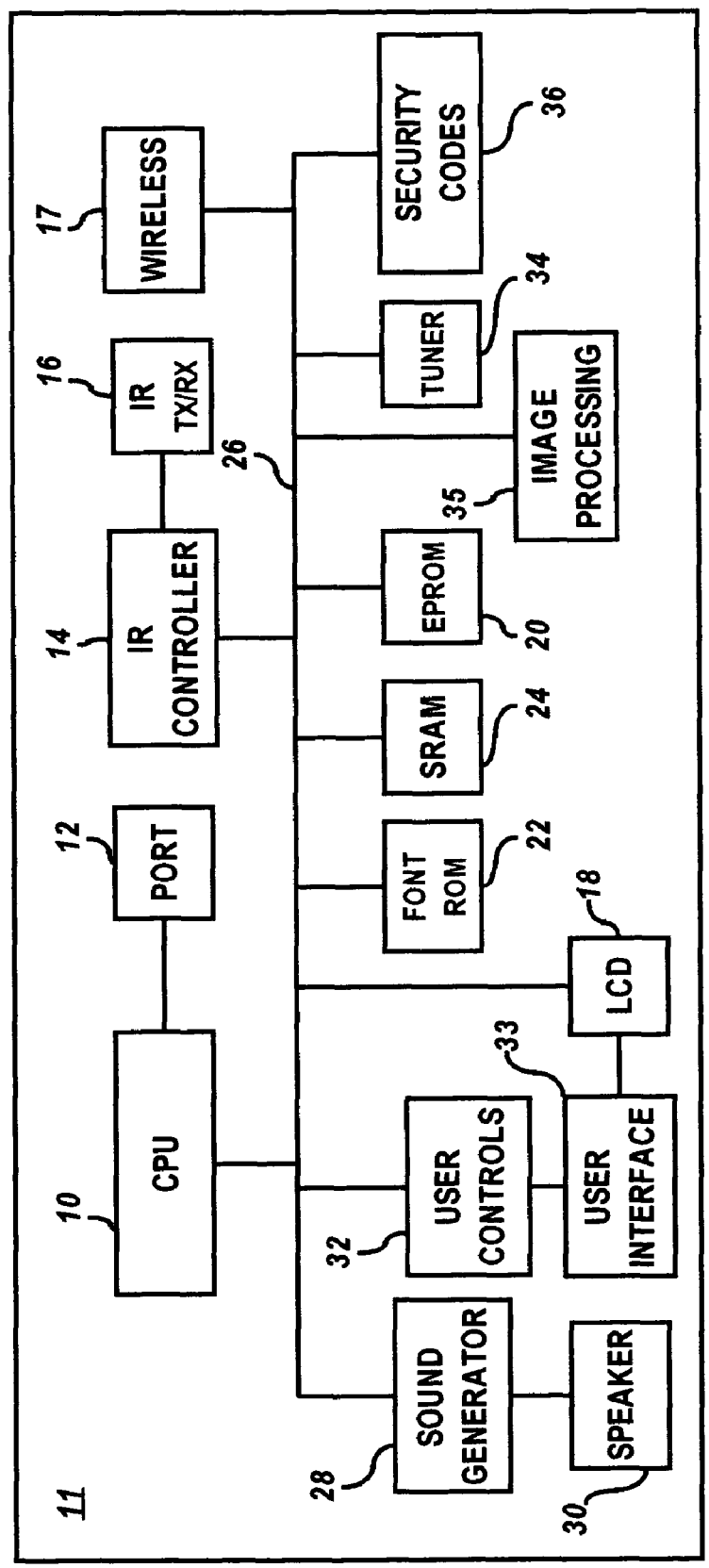
FIG. 1 depicts a block diagram illustrating components of a hand held device in which embodiments of the present invention may be implemented.

FIG. 1 depicts a schematic diagram illustrating a general hardware configuration of a hand held device 11 in accordance with an embodiment of the present invention. Those skilled in the art can appreciate, however, that other hardware configurations with less or more hardware and/or modules may be utilized in carrying out the methods and systems (e.g., hand held device 11) of the present invention as further described herein. CPU 10 of hand held device 11 performs as a main controller operating under the control of operating clocks supplied from a clock oscillator. CPU 10 may be configured, for example, as a 16-bit microprocessor. External pins of CPU 10 are generally coupled to an internal bus 26 so that it may be interconnected to respective components.

A SRAM 24 can be configured as a writeable memory that does not require a refresh operation and can be generally utilized as a working area of CPU 10. SRAM (Static RAM) is generally a form of semiconductor memory (RAM) based on a logic circuit known as a flip-flop, which retains information as long as there is enough power to run the device. Font ROM 22 can be configured as a read only memory for storing character images (e.g., font) displayable on a display 18. Examples of types of displays that may be utilized in accordance with display 18 include a TFT active matrix display, an illuminated LCD (Liquid Crystal Display), or other small-scale displays being developed.

CPU 10 of the present embodiment drives display 18 utilizing, among other media, font images from Font ROM 22, and images transmitted as data through wireless unit 17 and processed by image-processing module 35. An EPROM 20 may be configured as a read only memory that is generally erasable under certain conditions and can be utilized for permanently storing control codes for operating respective hardware components and security data, such as a serial number.

An IR controller 14 can generally be configured as a dedicated controller for processing infrared codes transmitted/received by an IR transceiver 16 and for capturing the same as computer data. Wireless unit 17 can generally be configured as a dedicated controller and transceiver for processing wireless data transmitted from and to a wireless communications network. Note that wireless unit 17 can be implemented as a separate module or cartridge, such as illustrated in FIG. 3. Wireless unit 17 can thus comprise a wireless module.

Port 12 can be connected to CPU 10 and can be temporarily attached, for example, to a docking station to transmit information to and from hand held device 11 to other devices such as personal computers, retail cash registers, electronic kiosk devices, and so forth. Port 12 can also be configured, for example, to link with a modem, cradle or docking station that permits network devices, a personal computer or other computing devices to communicate with hand held device 11.

User controls 32 permit a user to enter data to hand held device 11 and initiate particular processing operations via CPU 10. A user interface 33 may be linked to user controls 32 to permit a user to access and manipulate hand held device 11 for a particular purpose, such as, for example, viewing images on display 18. Those skilled in the art will appreciate that user interface 33 may be implemented as a touch screen user interface, as indicated by the dashed lines linking display 18 with user interface 33. In addition, CPU 10 may cause a sound generator 28 to generate sounds of predetermined frequencies from a speaker 30. Speaker 30 may be utilized to produce music and other audio information associated with video data transmitted to hand held device 11 form an outside source.

It can be appreciated that additional electronic circuits or the like other than, or in addition to, those illustrated in FIG. 1 may be used to construct hand held device 11. Such components, however, are not described in the present specification, because many aspects of them are well known in the art. For example, hand held televisions are available for receiving public television broadcasts, but the basic technology can be modified on such devices so that they may be adapted to (e.g., proper authentication, filters, security codes, or the like) receive venue-based RF transmissions from at least one venue-based RF source (e.g., a wireless camera, or data from a camera transmitted wirelessly through at least one transmitter). Because of the brevity of the drawings described herein, however, only a portion of the connections between the illustrated hardware blocks is generally depicted. In addition, it can be appreciated that hand held device 11 can be implemented as a specific type of a hand held device, such as a Personal Digital Assistant (PDA), paging device, WAP-enabled mobile phone, and other associated hand held computing devices well known in the art.

Given the teaching of various embodiments of the present invention, it should be appreciated that a hand held device 11 can be configured to permit images, similar to television broadcast images, to be displayed on display 18 for a user to view. Hand held device 35 thus includes an image-processing unit 35 for processing images transmitted as data to hand held device 11 through wireless unit 17. A tuner unit 34, implemented as either a single tuner or a plurality of tuners, may be linked through internal bus 26 to CPU 10. Additionally, a security unit 36 may be utilized to process proper security codes to thereby ensure that data transferred to and from hand held device 11 may be secure and/or permitted. Broadcast security prevents general receipt of venue images without proprietary hardware and/or signals.

Security unit 36 may be implemented as an optional feature of hand held device 11. Security unit 36 can also be configured with software, e.g., algorithm routines or subroutines, that are processed by CPU 10, and which prevent wireless data from being transmitted/received from hand held device 11 beyond a particular frequency range, outside of a particular geographical area associated with a local wireless network, or absent authorization codes (e.g., decryption, encryption, coding, decoding, and so forth). Note that security unit 36 can be implemented as a separate security module, such as, for example, a smart card, or cartridge. An example of a module, which may be implemented in accordance with the methods and systems of the present invention, is illustrated in FIG. 3. A security module of this type may be utilized for securing data transmitted from or to a hand held device such as, for example, hand held device 11.

Hand held device 11 can thus be configured with both wireless and wireline capabilities, depending on the needs and requirements of a manufacturer or customer. Such wireless capabilities include features such as those found in cellular telephone units, in accordance with carrying out embodiments of the present invention. Current examples of hand held devices that can be utilized in accordance with the methods and systems of the present invention include the "PalmPilot™" PDA, manufactured and sold by Palm Computing, the Handspring Visor™, Window CE™ compatible devices, RIM™ Blackberry-family paging devices, Motorola paging devices, hand held portable televisions, and the Symbol™ SPT-family of PDA-type organizer devices. Such hand held devices are mentioned herein for illustrative purposes only and are not considered limiting features of the present invention.

Hand held devices which may also be implemented in accordance with the methods and systems of the present invention include hand held devices, such as cellular telephones having viewable display screens for the display of data transmitted through wireless networks. Customized, venue-specific devices (i.e., proprietary, limited use) may be also developed in accordance with the methods and systems of the present invention that incorporate hardware and software modules necessary to practice the methods and systems taught herein.

Those skilled in the art can appreciate that although hand held device 11 is generally illustrated in FIG. 1, hand held device 11 can be implemented as a wireless application protocol (WAP) web-enabled cellular hand held device, such as a PDA, wireless telephone, or pager or a combination thereof. Hand held device 11 can also be configured with features of combination cellular telephone/PDA devices. One recent example of such a device is the Handspring™ PDA and associated cellular phone attachment module, which is manufactured and sold by Handspring™ Inc.

Other such devices include the Palm-Motorola phone, which permits users to access e-mail and store calendars and contact databases. Hand held devices may also be provided in the form of a multi-RF (Radio Frequency) receiver-enabled hand held television-viewing device, such as those manufactured by Sony™ and Casio™. Regardless of the type of hand held device implemented, it is anticipated that such hand held devices will be adapted to receive and process data via image-processing unit 35 for ultimate display as moving images on display unit 18, in accordance with the present invention. Image-processing unit 35 may include image-processing routines, subroutines, software modules, and so forth, to perform image-processing operations.

FIG. 2 illustrates a pictorial representation of a hand held device 40 that may be utilized to implement preferred embodiments of the present invention. Hand held device 40 includes a display screen 42, which is generally analogous to display 18 of FIG. 1. Television images broadcast via radio frequency or digital data may be displayed on display screen 42 for a user to view. User controls 44 can permit a user to select and/or manipulate images or text displayed on display screen 42. User controls 44 of FIG. 2 are generally analogous to user controls 32 of FIG. 1. A touch screen user interface may be further configured on the display screen 42 with hand held device 40 to permit a user to manipulate images/text displayed on display screen 42.

FIG. 3 depicts a pictorial representation of a hand held device 56 adapted for receiving a module 50, in accordance with embodiments of the present invention. Although hand held device 56 of FIG. 3 is generally analogous to hand held device 40 of FIG. 2, the difference being that hand held device 56 may be adapted to receive a module/cartridge that permits hand held device 56 to function according to specific hardware, codes and/or instructions contained in a memory location (e.g., a computer chip or magnetic strip) within module 50. Module 50 can be configured as a smart card, well known in the art. Such a smart card may provide, for example, access codes (e.g., decryption) to enable hand held device 56 to receive venue broadcasts.

Note that as utilized herein, the term "module" may refer to a physical module, such as a cartridge. The term "module" may also refer to a software module composed of routines or subroutines that perform a particular function. Those skilled in the art can appreciate the meaning of the term module is based on the context in which the term is utilized and environment being described. Thus, module 50 as illustrated can be generally configured as a physical cartridge or smart card. The term "module" as utilized herein may also refer to a software module, depending on the context of the discussion thereof.

To illustrate the use of a physical module, such as module 50, assume that a user may possess several such physical modules or cartridges. One module, when inserted into hand held device FIG. 3 may instruct hand held device 50 to function as a standard PDA, such as a Palm Pilot device. Another module, when inserted into hand held device FIG. 3, may instruct hand held device 56 to function as a portable television that receives wireless television broadcasts and/or data from a local wireless broadcast network and/or venue-based (e.g., short range) broadcasts. Such a module can also incorporate decryption capabilities to receive controlled/secured broadcasts at venues.

Those skilled in the art can thus appreciate that hand held device 56 can be adapted to receive and cooperate with module 50. Additionally, hand held device 56 includes a display screen 52 that is generally analogous to display screen 42 of FIG. 2 and display 18 of FIG. 1. Hand held device 56 also includes user controls 54 that are generally analogous to user controls 44 of FIG. 2 and user controls 32 of FIG. 1. Hand held device 56 of FIG. 3 is generally analogous to hand held device 11 of FIG. 1. Thus, hand held device 56 can also implement touch screen capabilities through a touch screen user interface integrated with display screen 52.

Assuming module 50 is implemented as a smart card instead of a cartridge to provide receiver and/or securing capabilities (e.g., encryption, decryption, coding, decoding, etc.), it is anticipated that similar features can be implemented in accordance with a smart card to insure that hand held device 56 includes touch screen user interface and video viewing capabilities. Smart cards are generally known in the art as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards may be generally configured as either a contact or contactless smart card, or a combination thereof. A contact smart card requires insertion into a smart card reader (e.g., contained within hand held device 56) with a direct connection to, for example, a conductive micromodule on the surface of the card. Such a micromodule may be generally gold plated. Transmission of commands, data, and card status takes place through such physical contact points.

A contactless card requires only close proximity to a reader. Both the reader and the card may be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards, are the so-called Combi cards and Hybrid cards.

A Hybrid card generally may be equipped with two chips, each with a respective contact and contactless interface. The two chips are not connected, but for many applications, this Hybrid serves the needs of consumers and card issuers. The Combi card may be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

Figure 4:
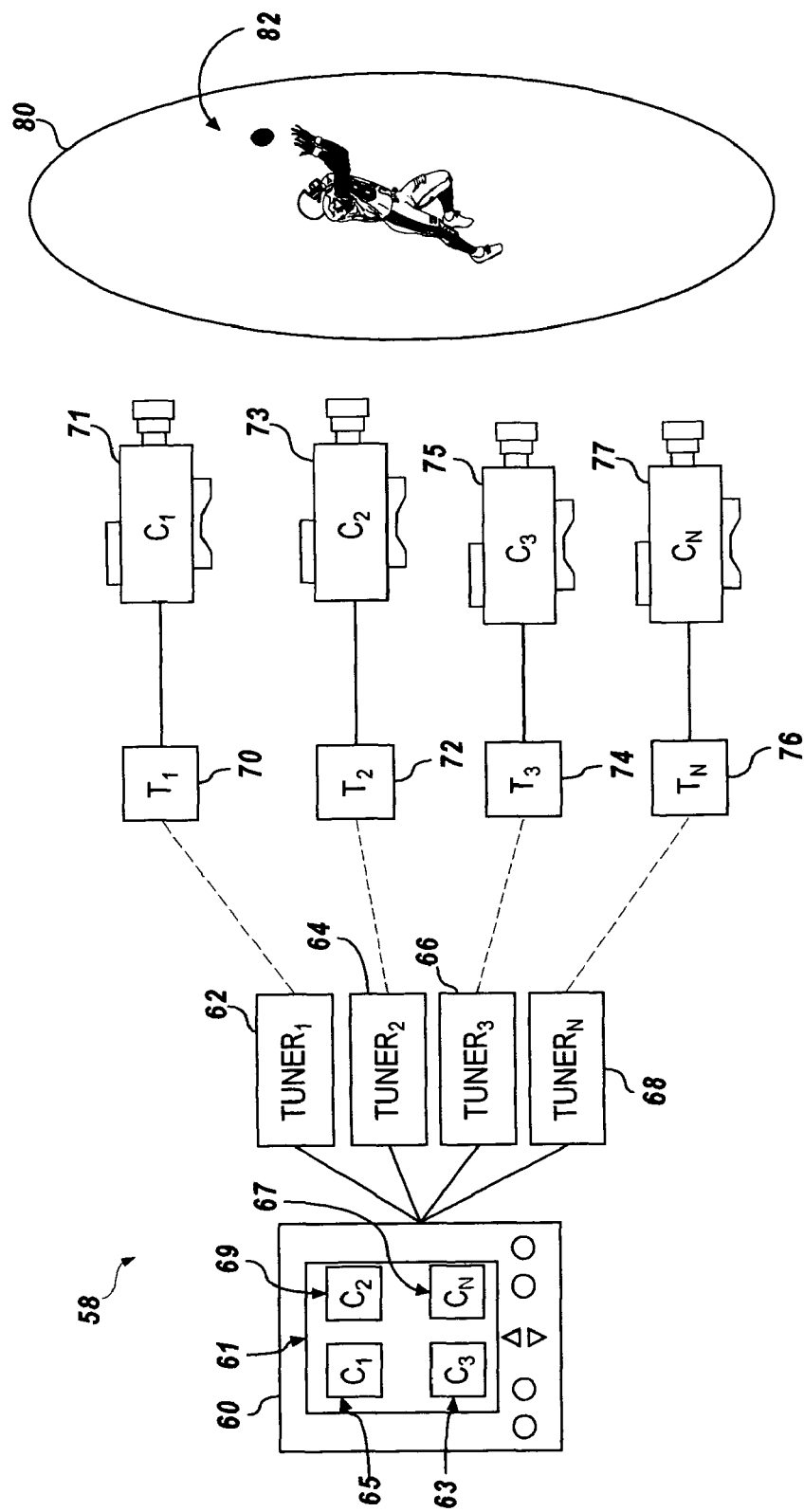
FIG. 4 illustrates a system for providing multiple perspectives through a hand held device of activities at a venue in accordance with embodiments of the present invention.

FIG. 4 illustrates a system 58 for providing multiple perspectives through a hand held device 60 of activities at a venue 80, in accordance with embodiments of the present invention. For illustrative purposes only, it may be assumed that venue 80 of FIG. 4 is a stadium venue, such as a football stadium. Cameras 71, 73, 75, and 77 are respectively positioned at strategic points about venue 80 to capture the best images of activity taking place within venue 80. Cameras 71, 73, 75, 77 are respectively linked to transmitters 70, 72, 74, and 76. Each of these transmitters may be configured as equipment, which feeds a radio signal to an antenna for transmission. The equipment may also provide for the securing transmission of signals and associated data. For example, such equipment can rely on the encryption of signals. These signals, if encrypted, can be decrypted by authorized hand held receivers.

The antenna may be integrated with the transmitter. Transmitters are well known in the art, and include active components, such as a driver, well known in the art. Transmitters also include passive components, such as a TX filter, also well known in the art. These components, when operating together, impress a signal onto a radio frequency carrier of the correct frequency by immediately adjusting its frequency, phase, or amplitude, thereby providing enough gain to the signal to project it to its intended target (e.g., a hand held device located within the venue).

A hand held device 60 may be held by a user at a stadium seat within view of the activity at the venue 80. Hand held device 60 is generally analogous to hand held device 11 of FIG. 1 and hand held device 40 of FIG. 2. Hand held device 60 of FIG. 4 may be configured as a hand held device (e.g., PDA, portable television, etc.) adapted for use with a cartridge/module, such as module 50 of hand held device 56 of FIG. 3. The cartridge/module may contain the electronics (e.g., tuner(s), filter(s), security codes, encryption/decryption codes, etc.) to allow a hand held device to be adapted for receiving venue-based data. Hand held device 60 includes a display screen 61 (e.g. display 18 of FIG. 1).

Additionally, display screen 61 of hand held device 60 may be configured with a touch screen user interface displayable and operable on display screen 61. Those skilled in the art can appreciate that touch screen interfaces are well known in the PDA art and further explanation thereof should not be necessary. Display screen 61 can include a touch screen display area 65 that may be associated with camera 71. Thus, images captured by camera 71 are transmitted from transmitter 70, which is linked to camera 71. Additionally, display screen 61 includes touch screen display areas 69, 63, and 67, which are respectively associated with cameras 73, 75, and 77.

Cameras 71, 73, 75, and 77 are respectively labeled $C_1, C_2, C_3$, and $C_N$ to indicate that a plurality of cameras may be utilized in accordance with system 58 to view activities taking place within venue 80, such as a football game or concert. Although only four cameras are illustrated in FIG. 4, those skilled in the art will appreciate that additional or fewer cameras may be also implemented in accordance with system 58. Touch screen display areas 65, 69, 63, and 67 are also respectively labeled $C_1$, $C_2$, $C_3$, and $C_N$ to illustrate the association between these display areas and cameras 71, 73, 75, and 77 where touch screen technology is utilized.

Hand held device 60 can be integrated with one or more plurality of tuners, as illustrated by tuners 62, 64, 66, and 68. Such tuners can be activated via user controls on hand held device 60 and/or via touch screen icons or areas displayed on display screen 61 that are associated with each tuner. Such icons/areas may be respectively displayed within display areas 65, 69, 63 and 67, or within a separate display area of display screen 61 (e.g., picture-within-picture capabilities found on large television sets). A user accesses tuner 62, for example, to retrieve real-time video images transmitted from transmitter 70 for camera 71. Likewise, a user can access tuner 64 to retrieve real-time video images transmitted from transmitter 72 for camera 73.

In addition, a user can access tuner 74 to retrieve real-time video images transmitted from transmitter 74 for camera 75. Finally, user can access tuner 68 to retrieve real-time video images transmitted from transmitter 76 for camera 77. In the example depicted in FIG. 4, a football player 82 is participating in a football game within venue 80. Cameras 71, 73, 75, and 77 capture moving images (e.g., video data) of the football player 82 from various angles and transmit these images to hand held device 60.

Figure 5:
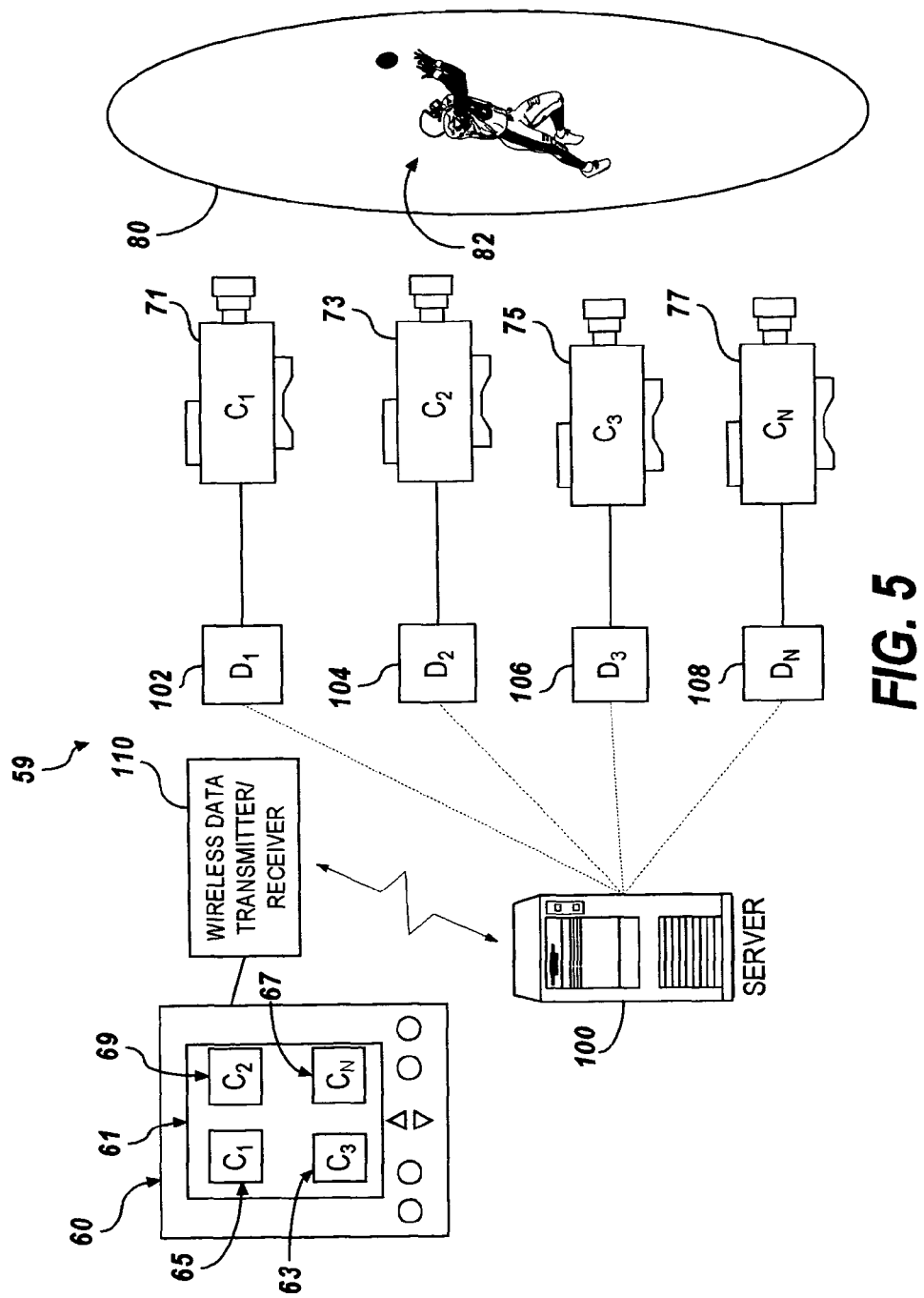
FIG. 5 depicts a system that provides multiple perspectives of a venue activity through a hand held device adapted to receive and process real time video data in accordance with embodiments of the present invention.

FIG. 5 depicts a system 59 that provides multiple perspectives of activity at a venue 80 through a hand held device 60 adapted to receive and process real time video data in accordance with embodiments of the present invention. Note that in FIG. 4 and FIG. 5 analogous parts are indicated by identical reference numerals. Thus, for example, cameras 71, 73, 75, and 77 of FIG. 5 are analogous to cameras 71, 73, 75, and 77 of FIG. 4. Hand held device 60 of FIG. 5 is also analogous to hand held device 60 of FIG. 4 and includes similar features thereof.

Hand held device 60 of FIG. 5, however, can be configured to receive wireless real time video data transmitted for cameras 71, 73, 75, and 77 respectively through data transmitters 102, 104, 106, and 108 to server 100 and thereafter to wireless data transmitter/receiver 110. Note that wireless data transmitter/receiver 110 is analogous to wireless unit 17 of FIG. 1. Hand held device 60 of FIG. 5 is also analogous to hand held device 11 of FIG. 1.

Hand held device 60 of FIG. 5 can also incorporate a touch screen user interface, as described herein with respect to analogous hand held device 60 of FIG. 4. The difference between system 58 of FIG. 4 and system 59 of FIG. 5 lies in the inclusion of digital transmitters 102, 104, 106, and 108 which are respectively linked to cameras 71, 73, 75, and 77 of FIG. 5. In the illustration of FIG. 5, cameras 71, 73, 75, and 77 may be configured as high definition video cameras which capture real time images of events or activities taking place within venue 80, such as real time video footage of football player 82.

A captured image of football player 82, for example, can be transferred from one or more of video cameras 71, 73, 75, and 77 of FIG. 5 and transmitted through a respective digital transmitter, such as digital transmitter 102, 104, 106 or 108 and transmitted via wired and/or wireless communications to server 100. The server 100 then processes the video data received from one or more of the digital transmitters and formats the video data for transmission via wireless means to wireless data transmitter/receiver 100, which may be integrated with hand held device 100. Transmitter/receiver 100 can communicate with the various components of hand held device 60, such as a CPU, image-processing unit, memory units, and so forth.

Those skilled in the art can appreciate that although real time video data may be transmitted to server 100, captured past video images may also be stored within server 100 and transferred to hand held device 60 for display at display screen 61. For example, instant replays may be transferred as video data to hand held device 60 upon the request of a user of hand held device 60. Such instant replay footage can be displayed on display screen 61 for the user to view.

Figure 6:
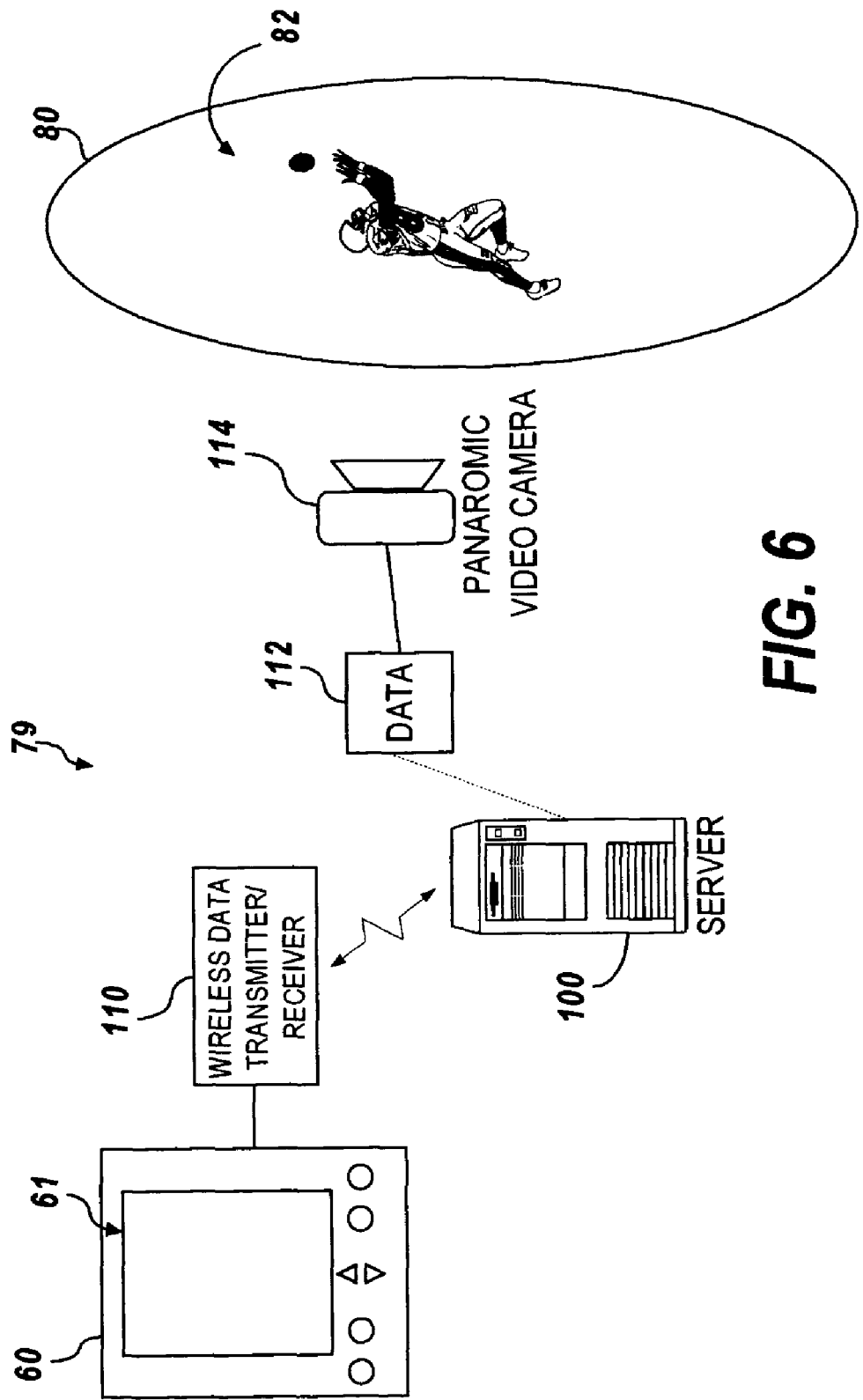
FIG. 6 depicts a system for providing multiple perspectives of activity at a venue through a hand held device adapted to receive and process real time video data in accordance with embodiments of the present invention.

FIG. 6 illustrates a system 79 for providing multiple perspectives of activity at a venue 80 through a hand held device 60 adapted to receive and process real time video data from at least one wide-angle and/or panoramic video camera 114, in accordance with embodiments of the present invention. In system 79 of FIG. 6, wide-angle/panoramic (hereinafter referred to as "panoramic") video camera 114 may be configured as a high-definition panoramic video camera that captures images of activities taking place at venue 80. In the example illustrated in FIG. 6, panoramic video camera 114 can capture of images of a football game and one or more football players, such as illustrated football player 82.

A data transmitter 112 may be linked to panoramic video camera 114. Video data captured by panoramic video camera 114 may be transferred to data transmitter 112, which thereafter transmits the video data to server 100 via a direct link or wireless link, depending on the needs or requirements of the promoters or venue owners. Note that this is also true of the system described in FIG. 6. Server 100 of FIG. 6 is analogous to server 100 of FIG. 5. Thus, in the case of FIG. 5, video data may be transmitted from one or more of data transmitters 102, 104, 106, and 108 via a direct wire/cable link or through wireless transmission means, such as through a wireless network.

Those skilled in the art will appreciate, of course, that hand held device 60 of FIG. 6 is analogous to hand held devices depicted in FIGS. 1-5 herein. In FIGS. 4, 5, and 6, like or analogous parts are identified by identical reference numerals. Thus, images captured by panoramic video camera 114 of activity taking place at venue 80 may be displayed as real time video images or instant replay data on display screen 61 of hand held device 60.

Figure 7:
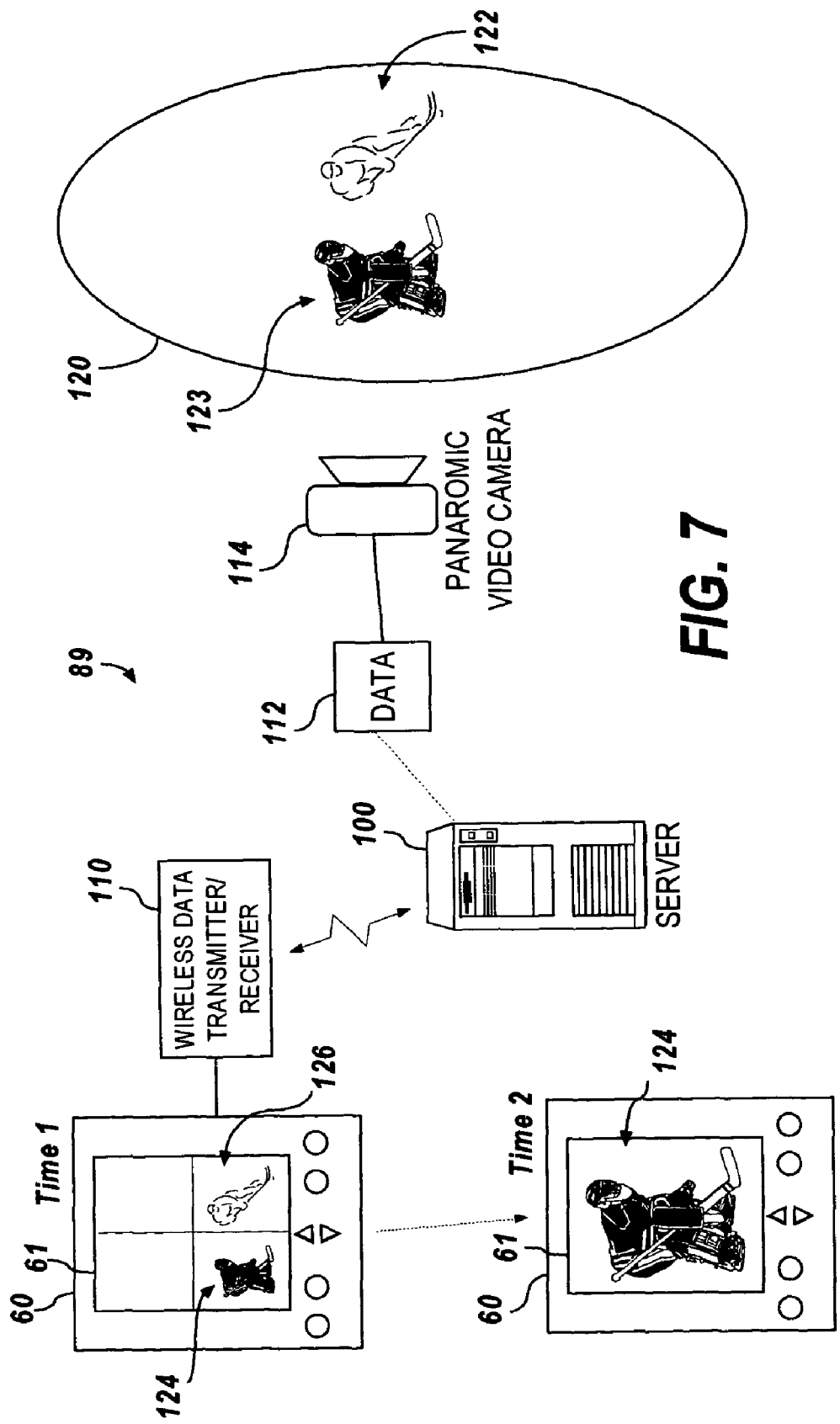
FIG. 7 depicts a system for providing multiple perspectives for activity at a venue at a first time/perspective and a second time/perspective in accordance with embodiments of the present invention.

FIG. 7 depicts a system 89 for providing multiple perspectives for activity at a venue 120 at a first time and/or perspective (Time 1) and a second time and/or perspective (Time 2), in accordance with embodiments of the present invention. In FIGS. 4, 5, 6, and 7, like or analogous parts are indicated by identical reference numerals. Thus, in system 89 of FIG. 7, an event, in this case illustrated as a hockey game, is taking place within venue 120. Venue 120 may be, for example, a hockey arena. Panoramic video camera 114 may be linked to data transmitter 112.

As explained previously, data transmitter 112 may be linked to server 100 via a direct link, such as a transmission cable or line, or through wireless communication means, such as through a wireless network. Server 100 can also communicate with hand held device 60 through a wireless network or other wireless communication means by transmitting data through such a network or wireless communications means to wireless data transmitter/receiver 110. Wireless data transmitter/receiver 110, as explained previously, may be integrated with hand held device 60.

Thus, a video image 124 of a hockey player 122 can be captured as video data by panoramic video camera 114, along with a video image 126 of a hockey player 123 and displayed within display screen 61 of hand held device 60 as indicated at Time 1. Video image 124 and 126 can be displayed within a grid-like interface on display screen 61. Note that in the illustration of FIG. 7, display screen 61 may be divided into four sections.

When a user touches, for example the area or section of display screen 61 in which video image 124 may be displayed, the entire display area of display screen 61 can then be consumed with a close-up video shot of video image 124, as indicated at Time 2, thereby providing the user with a closer view of hockey player 122. Those skilled in the art can appreciate that the touch screen display area of display screen 61 can be arranged with graphical icons and/or user-controls that perform specific pan and zoom functions.

Such icons/user-controls, when activated by a user, permit the user to retrieve panned/zoomed images of events taking place in real time within venue 120. Note that although only one panoramic video camera 114 and one data transmitter 112 are illustrated in FIG. 7, a plurality of panoramic video cameras, servers, and data transmitters may be implemented in accordance with the present invention to capture the best video images, image-processing, and signal capacity to users, whether real time or otherwise, of events taking place at venue 120.

Figure 8:
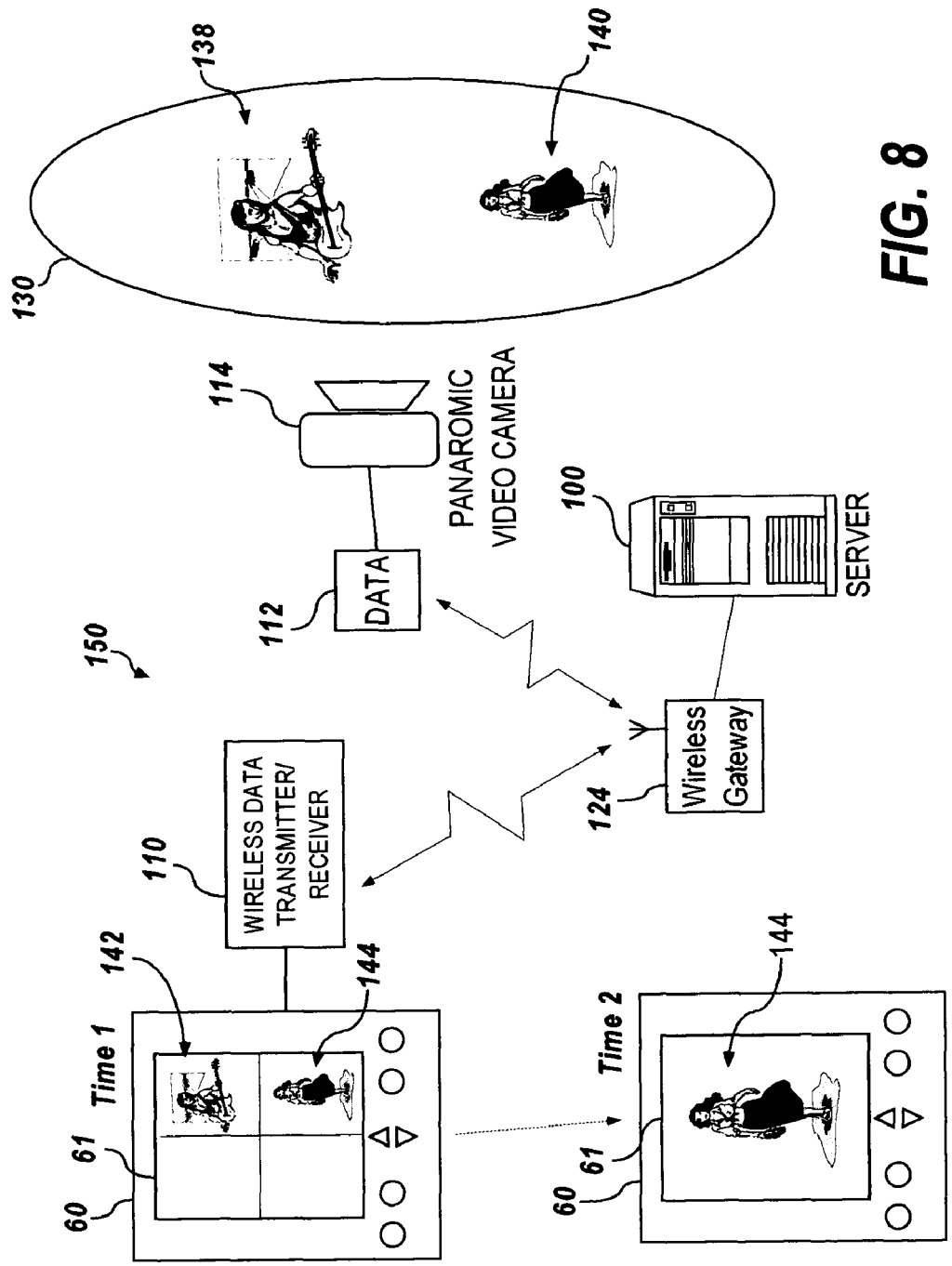
FIG. 8 illustrates a system for providing multiple perspectives through a hand held device of an activity at a venue including the use of a wireless gateway in accordance with an embodiment of the present invention.

FIG. 8 illustrates a system 92 for providing multiple perspectives through hand held device 60 of an activity at a venue 130, including the use of a wireless gateway 124, in accordance with an embodiment of the present invention. Those skilled in the art can appreciate that wireless gateway 124 may be configured as an access point for a wireless LAN (Local Area Network). Access points for wireless LAN networks and associated wired and wireless hardware (e.g., servers, routers, gateways, etc.) are well known in the art and may be utilized in accordance with the present invention described herein. Again, note that in FIGS. 4, 5, 6, 7, and 8, like or analogous parts are indicated by identical reference numerals. System 92 of FIG. 8 is analogous to system 89 of FIG. 7, the difference being in the nature of the venue activity. Venue 130 can be, for example, a concert hall or stadium configured with a sound stage.

Figure 9:
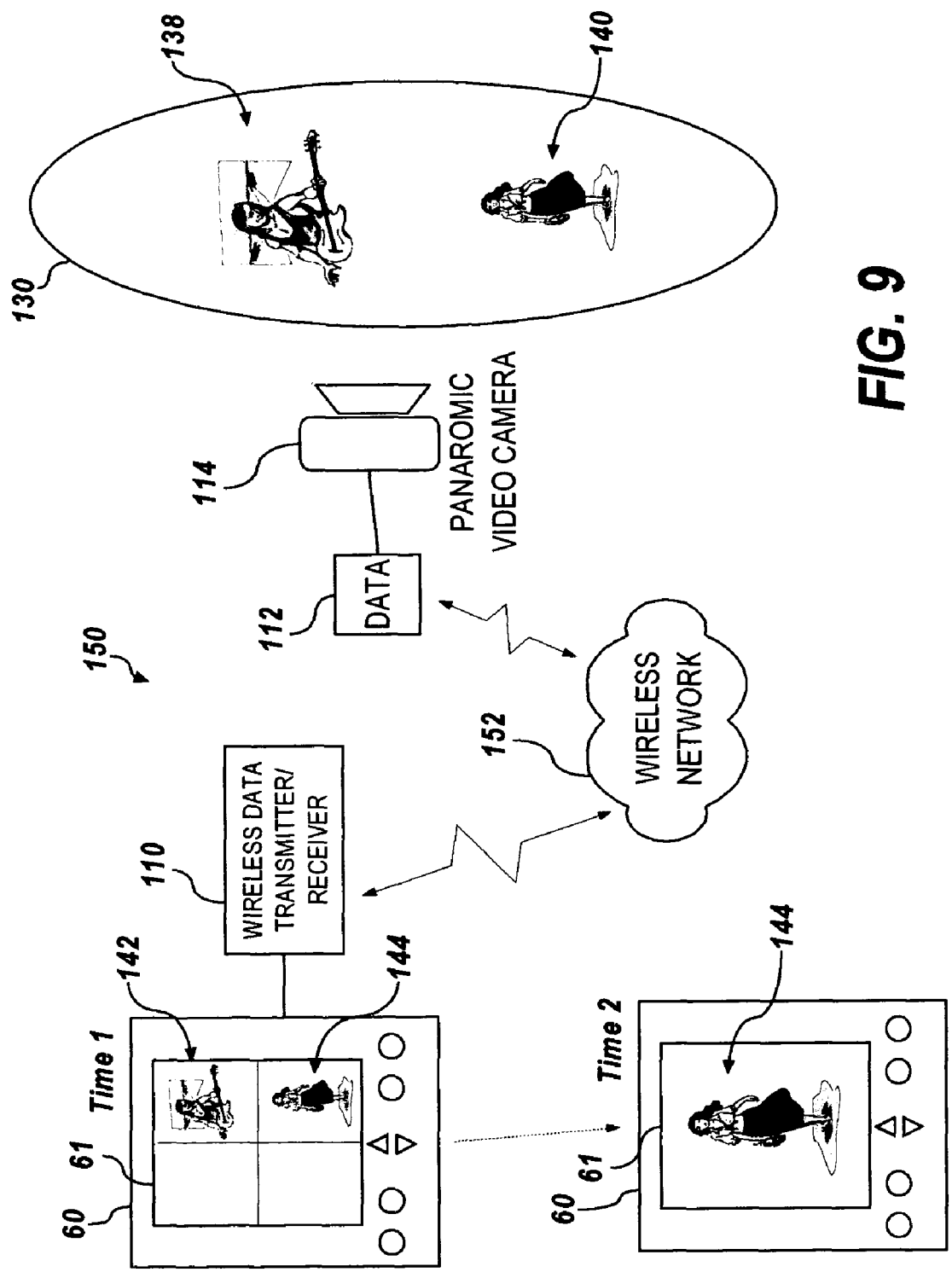
FIG. 9 depicts a system for providing multiple perspectives through a hand held device of a venue activity, in association with a wireless network in accordance with embodiments of the present invention.

Gateway 124 can be configured as a communications gateway through which data may enter or exit a communications network, such as wireless network 152 illustrated in FIG. 9 for a large capacity of user hand device 60 users. Wireless network 152 may be configured as a wireless LAN network. Hand held device 60 can be configured to communicate and receive transmissions from such a wireless LAN network based on device identification (e.g., device address).

Communication with hand held devices, such as hand held device 60, however, may also be achieved through RF (Radio Frequency) broadcasts, thereby not requiring two-way communication and authentication between, for example, a wireless LAN network and such hand held devices. A broadcast under such a scenario may also require that such a hand held device or hand held devices possess decryption capabilities or the like in order to be authorized to receive transmissions from the venue.

The remaining elements of FIG. 8 are also analogous to the elements depicted in the previous drawings, with the addition of wireless gateway 124, which may be linked to server 100 and may be in communication with several wireless data transmitters/receivers 110 and one or more electronic hand held devices, including hand held device 60. Wireless data transmitter/receiver 110, as explained previously, may be integrated with hand held device 60. One or more panoramic video cameras, such as panoramic video camera 114, can be positioned at a venue 130 at locations that capture images not only of the events taking place on a concert stage, but also events taking place within the stadium itself.

If an audience member 140, for example, happens to be walking along a stadium aisle within view of panoramic video camera 114, the audience member's video image can be displayed as video image 144 within display screen 61 of hand held device 60, as indicated at Time 1. Likewise, panoramic video camera 114 captures images of band member 138 whose video image can be displayed as video image 142 within a display area of display screen 61, as indicated at Time 1.

Thus, a user of hand held device 60 can view not only the events taking place on a central performing platform of venue 130, but also other events within the arena itself. The band member 138 may be located on a central performing platform (not shown) of venue 130 when panoramic video camera 114 captures real-time video images of band member 138. The user may also, for example, wish to see a close-up of audience member 140. By activating user controls and/or a touch screen interface integrated with display screen 61, the user can, for example, pan or zoom to view a close-up video shot of audience member 140, as indicated at Time 2.

Captured video images are transferred from panoramic video camera 114 as video data through transmitter 112 to server 100 and through wireless gateway 124 to wireless data transmitter/receiver 110. Although a single server 100 is illustrated in FIG. 8, those skilled in the art can appreciate that a plurality of servers and/or wireless gateways can be implemented in accordance with the methods and systems of the present invention to process and deliver captured and transmitted video data. Based on the foregoing, those skilled in the art can appreciate that video data may be simultaneously transferred from server 100 or a plurality or servers to literally thousands of hand held devices located within the range of the wireless network and/or wireless gateways associated with venue 130.

FIG. 9 illustrates a system 150 for providing multiple perspectives through hand held device 60 of an activity at a venue 130 in association with a wireless network 152, in accordance with embodiments of the present invention. System 150 of FIG. 9 is analogous to system 92 of FIG. 8, the difference noted in the inclusion of wireless network 152. Thus, in FIG. 8 and FIG. 9, like or analogous parts are indicated by identical reference numerals. Video data captured by a camera or cameras, such as panoramic video camera 114, may be transferred to data transmitter 112, which transmits the video data to wireless network 152. Wireless network 152 then retransmits the data, at the request of authorized users of hand held devices, such as hand held device 60, to wireless data transmitters/receivers, such as transmitter/receiver 110 integrated with hand held device 60.

Those skilled in the art can appreciate that wireless network 152 may also receive and retransmit other data, in addition to video data. For example, a server or other computer system may be integrated with wireless network 152 to provide team and venue data, which can then be transferred to wireless data transmitter receiver 110 from wireless network 152 and displayed thereafter as team and venue information within display screen 61 of hand held device 60. Other data that may be transferred to hand held device for display include real-time and historical statistics, purchasing, merchandise and concession information, and additional product or service advertisements.

Such data can include box scores, player information and matchups, animated playbooks, shot/hit/pitch charts, historical information, and offense-defense statistics. In a concert venue, for example, as opposed to a sporting event, information pertaining to a particular musical group can be also transferred to the hand held device, along with advertising or sponsor information. Note that both the video data and other data described above generally comprise types of venue-based data.

Venue-based data, as referred to herein, may include data and information, such as video, audio, advertisements, promotional information, propaganda, historical information, statistics, event scheduling, and so forth, associated with a particular venue and/or its advertisers/sponsors generally not retrievable through public networks. Such information can be transmitted together with video data received from data transmitter 112. Such information may be displayed as streaming data within display area 61 of hand held device 60 or simply stored in a database within hand held device 60 for later retrieval by the user.

One example of a wireless network that may be utilized to implement wireless network 152 can be Bluetooth, which is described in greater detail herein, and was conceived originally to make up for the shortcomings of infrared technologies (IR). Because IR cannot be utilized to penetrate walls, carry data heavy signals, or operate within devices that are not in line of sight, Bluetooth, which is becoming well known the art, can be configured as or with wireless network 152.

Figure 10:
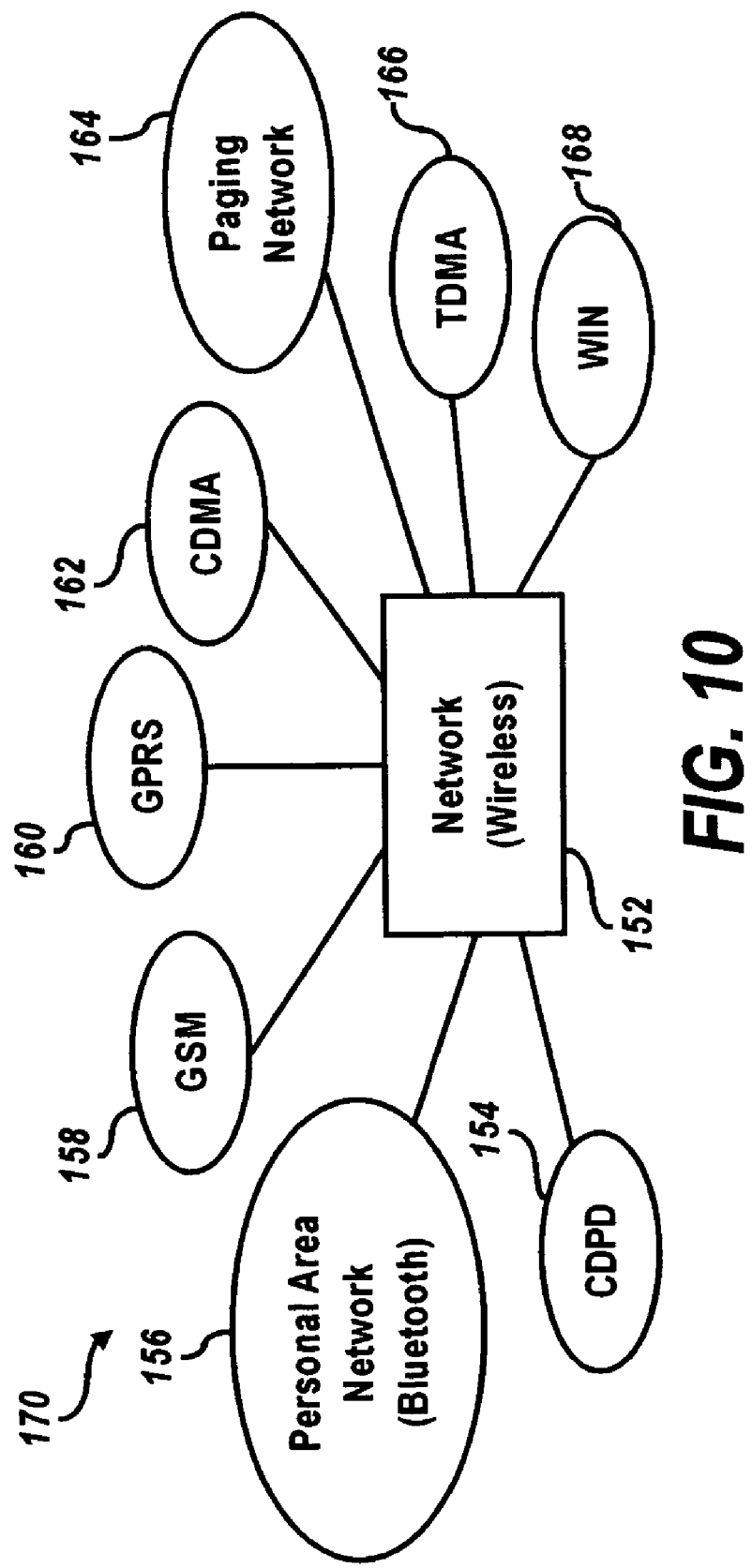
FIG. 10 illustrates a diagram depicting network attributes of a wireless network that may be utilized in accordance with embodiments of the present invention.

FIG. 10 illustrates an entity diagram 170 depicting network attributes of wireless network 152 that may be utilized in accordance with embodiments of the present invention. A wireless network 152 as illustrated in FIG. 10 can be configured as a variety of possible wireless networks. Thus, entity diagram 170 illustrates attributes of wireless network 152, which may or may not be exclusive of one another.

Those skilled in the art can appreciate that a variety of possible wireless communications and networking configurations may be utilized to implement wireless network 152. Wireless network 152 may be, for example, implemented according to a variety of wireless protocols, including cellular, Bluetooth, and 802.11 RF or direct IR communications. Wireless network 152 can be implemented as a single network type or a network based on a combination of network types (e.g., Bluetooth, CDMA, etc).

Wireless network 152 may be configured with teachings/aspects of CDPD (Cellular Digital Packet Data) networks well known in the networking arts. CDPD network 154 is illustrated in FIG. 10. CDPD may be configured as a TCP/IP based technology that supports Point-to-Point (PPP) or Serial Line Internet Protocol (SLIP) wireless connections to mobile devices, such as the hand held devices described and illustrated herein. Mobility and/or cellular service are generally available throughout the world from major service providers. Data can be transferred utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Wireless network 152 may preferably be also configured with teachings/aspects of a Personal Area Network 156 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein.

The Bluetooth standard permits up to 100 mw of power, which can increase the range to 100 M. In addition, Bluetooth can support several data channels. Utilizing short data packets and frequency hopping of up to 1600 hops per second, Bluetooth is a wireless technology that can be utilized to enable the implementation of the methods and systems described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 152 may also be configured utilizing teachings/aspects of GSM network 158. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that aspects of such new developments can be implemented in accordance with the present invention.

Wireless network 152 may also utilize teachings/aspects of GPRS network 160. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 152 may also be implemented utilizing teaching/aspects of a CDMA network 162 or CDMA networks. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at speeds up to 14.4 Kbps. Wireless network 152 may also be configured with a form of CDMA technology known as wideband CDMA (W-CDMA). Wideband CDMA may be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 152 may be also implemented utilizing teachings/aspects of paging network 164. Such paging networks, well known in the telecommunications arts, can be implemented in accordance with the present invention to enable transmission or receipt of data over the TME/X protocol, also well known in the telecommunications arts. Such a protocol enables notification in messaging and two-way data coverage utilizing satellite technology and a network of base stations geographically located throughout a particular geographical region. Paging network 162 can be configured to process enhanced 2-way messaging applications.

Unified messaging solutions can be utilized in accordance with wireless network 152 to permit carriers and Internet service providers to manage customer e-mail, voice messages and fax images and can facilitate delivery of these communications to PDAs, telephony devices, pagers, personal computers and other capable information retrieval devices, wired or wireless.

Current restrictions of such paging networks are not meant to limit the range or implementation of the present invention, but are described herein for illustrative purposes only. It is anticipated that such paging networks, including those based on the TME/X protocol, will be continually developed and that such new developments can be implemented in accordance with the present invention.

Wireless network 152 may also be configured utilizing teachings/aspects of TDMA networks 166. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user may be assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/information components. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 152 may also be configured utilizing teachings/aspects of Wireless Intelligent Networks (WINs) 168. WINs are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semi-permanent mobile subscriber (wireless device user) information for wireless carriers' entire subscriber base.

A useful aspect of WINs for the present invention is enabling the maintenance and use of customer profiles within an HLR/VLR-type database. Profile information may be utilized for example with season ticket holders and/or fans of traveling teams or shows. HLR subscriber information as used in WINs includes identity, service subscription information, location information (the identity of the currently serving VLR to enable routing of communications), service restrictions and supplementary services/information.

HLRs can handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR may also be configured as a database that contains temporary information concerning the mobile subscribers currently located in a given MSC serving area, but whose HLR may be elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to affect wireless and wireline call setup, routing, control, services, enhanced features and secure communications. Such systems and standards may be utilized to implement wireless network 152 in support of venue customers, in accordance with the present invention.

Improved operating systems and protocols allow Graphical User Interfaces (GUIs) to provide an environment that displays user options (e.g., graphical symbols, icons or photographs) on a wireless device's screen. Extensible Markup Language ("XML") is generally a currently available standard that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML may effectively enable one system to translate what another system sends. As a result of data transfer improvements, wireless device GUIs can be utilized in accordance with a hand held device and wireless network 152, whether configured as a paging network or another network type, to render images on the hand held device that closely represent the imaging capabilities available on desktop computing devices.

Figure 11:
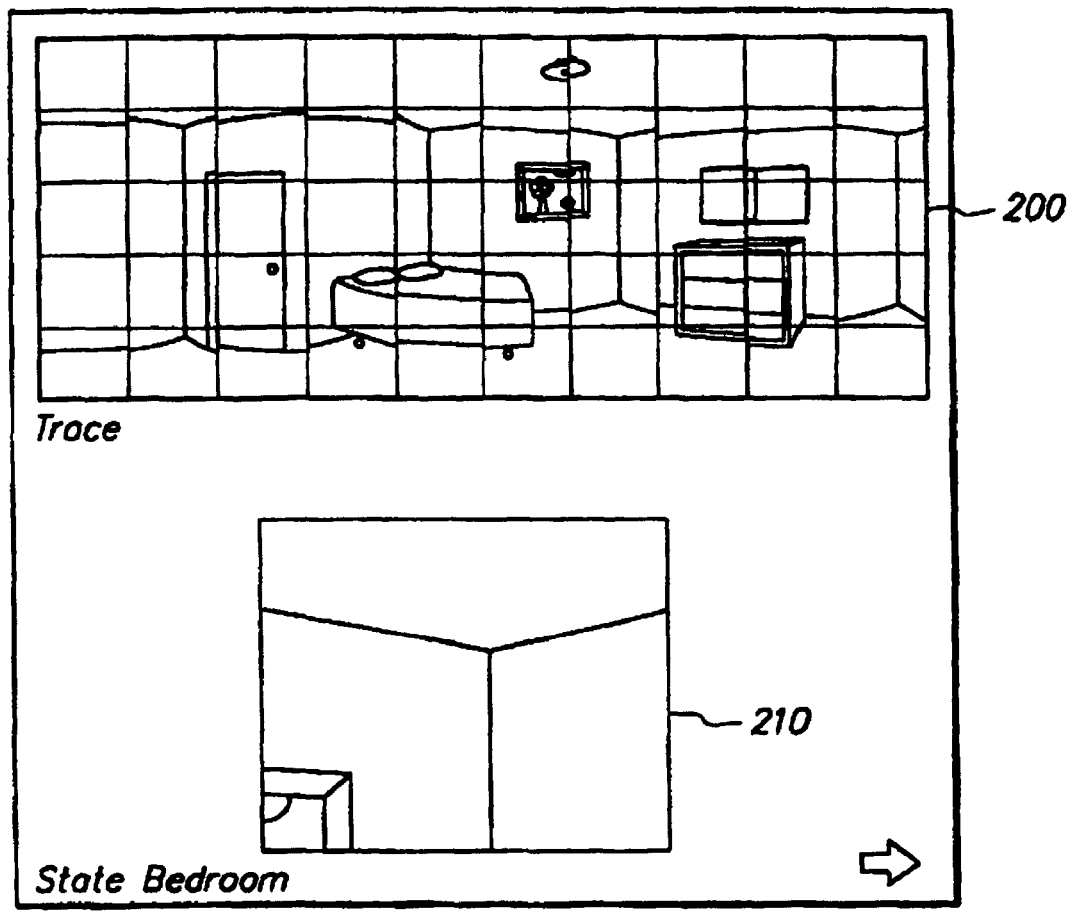
FIG. 11 depicts a prior art overview display and a detail window.

Those skilled in the art can appreciate that the system and logical processes described herein relative to FIG. 11 to FIG.

17 are not limiting features of the present invention. Rather, FIG. 11 to FIG. 17 provide examples of image-processing systems and logical processes that can be utilized in accordance with the present invention. Such a system and logical processes represent one possible technique, which may be utilized in accordance with one or more embodiments of the present invention to permit a user of a hand held device to manipulate video images viewable on a display screen of the hand held device. It can be appreciated by those skilled in the art that other types of image-processing systems and logical processes can be implemented in accordance with the methods and systems of the present invention. FIGS. 11 to 17 are provided for edification purposes only and as one possible illustrative example of camera and image processing systems that can be utilized in accordance with the methods and systems of the present invention.

Figure 12:
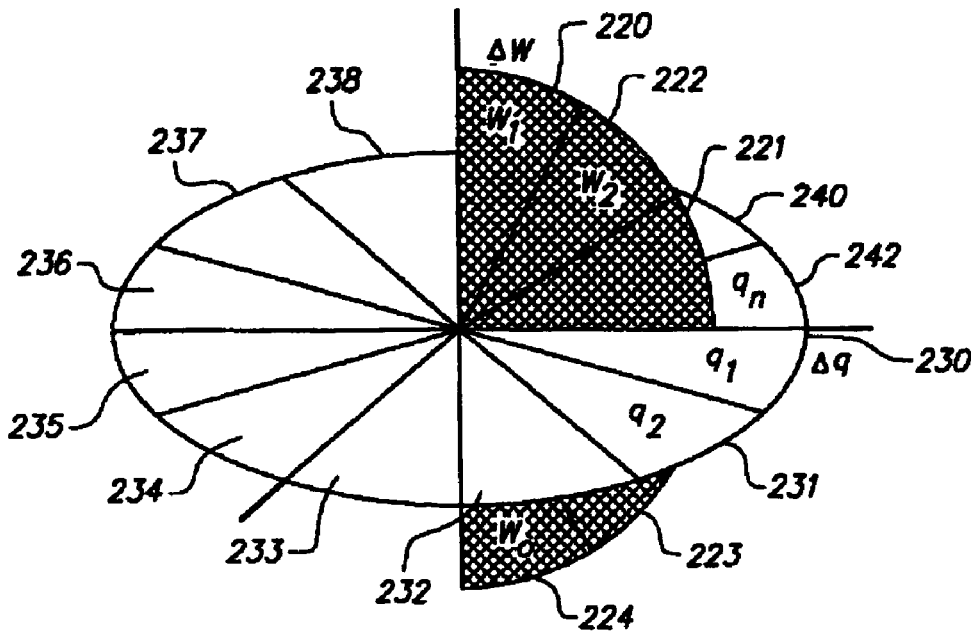
FIG. 12 illustrates a prior art spherical image space divided into a series of w rows and q columns, with the rows and columns representing individual frames as photographed from a video camera.

FIG. 11 thus illustrates a prior art overview display 200 and a detail window 210 that may be utilized with embodiments of the present invention. The overview image display 200 is a view representative of a 360° rotation around a particular point in a space. While a complete rotational view may be utilized in accordance with embodiments of the present invention, one of ordinary skill in the computer arts will readily comprehend that a semi-circular pan (e.g., such as utilized with wide-angle cameras) or other sequence of images could be substituted for the 360 degree rotation without departing from the subject invention. The vantage point is generally where the camera was located as it panned the space. Usually the scene is captured in a spherical fashion as the camera pans around the space in a series of rows as depicted in FIG. 12. The space is divided into w rows 220-224 and q columns 230-242 with each q representing another single frame as shown in FIG. 12.

Figure 13:
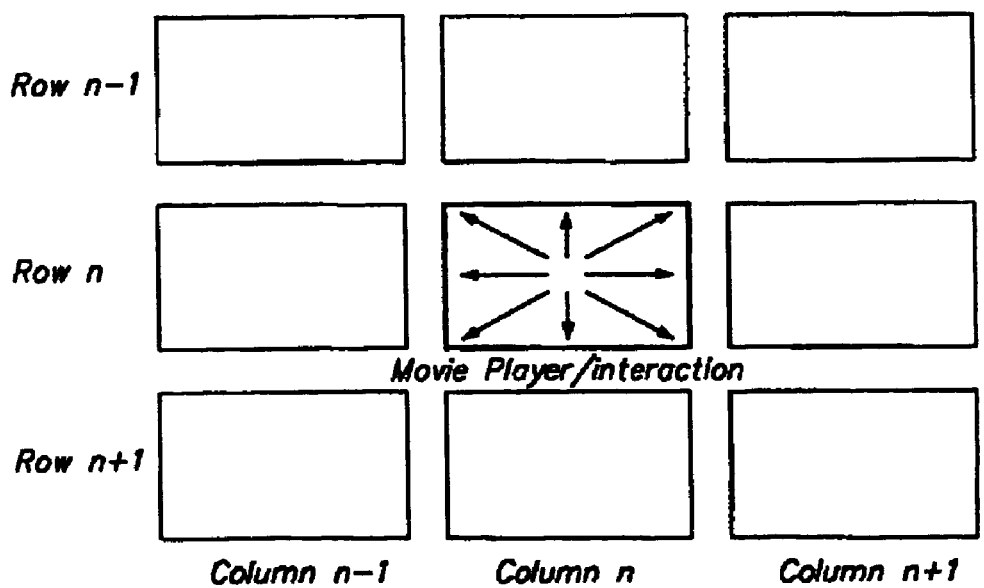
FIG. 13 depicts the two-dimensional representation of the spherical image space of FIG. 12 into rows and columns of image frames.

User control over the scene (e.g., rotation, pan, zoom) may be provided by pressing a touch screen display icon or moving a cursor displayed on a display screen of a hand held device, such as the hand held devices described herein. User control over the scene may also be provided by manipulating external user controls integrated with a hand held device (e.g., user controls 44 and 54 of FIG. 2 and FIG. 3). Movement from a frame in the overview image display to another frame is in one of eight directions as shown in FIG. 13. The user may interact with the video representation of the space one frame at a time. Each individual frame is an image of one of the pictures taken to capture the space as discussed above. The individual frames may be pieced together.

Interacting with a video, one frame at a time can result in the ability to present a detailed view of the space. The user can experience the overview image display as it unfolds a single frame at a time. In a venue application, a user may chose to view different sections of a larger area by browsing to a particular area are provided. The area chosen may be at a high resolution allowing for the user to zoom in and out of the section.

Another limitation of a simple overview viewer is that there is no random access means. The frames can only be viewed sequentially as the overview image display is unfolded. As adapted for use in accordance with the present invention, this problem has been overcome by providing tools to browse, randomly select and trace selected images associated with any overview image.

Figure 14:
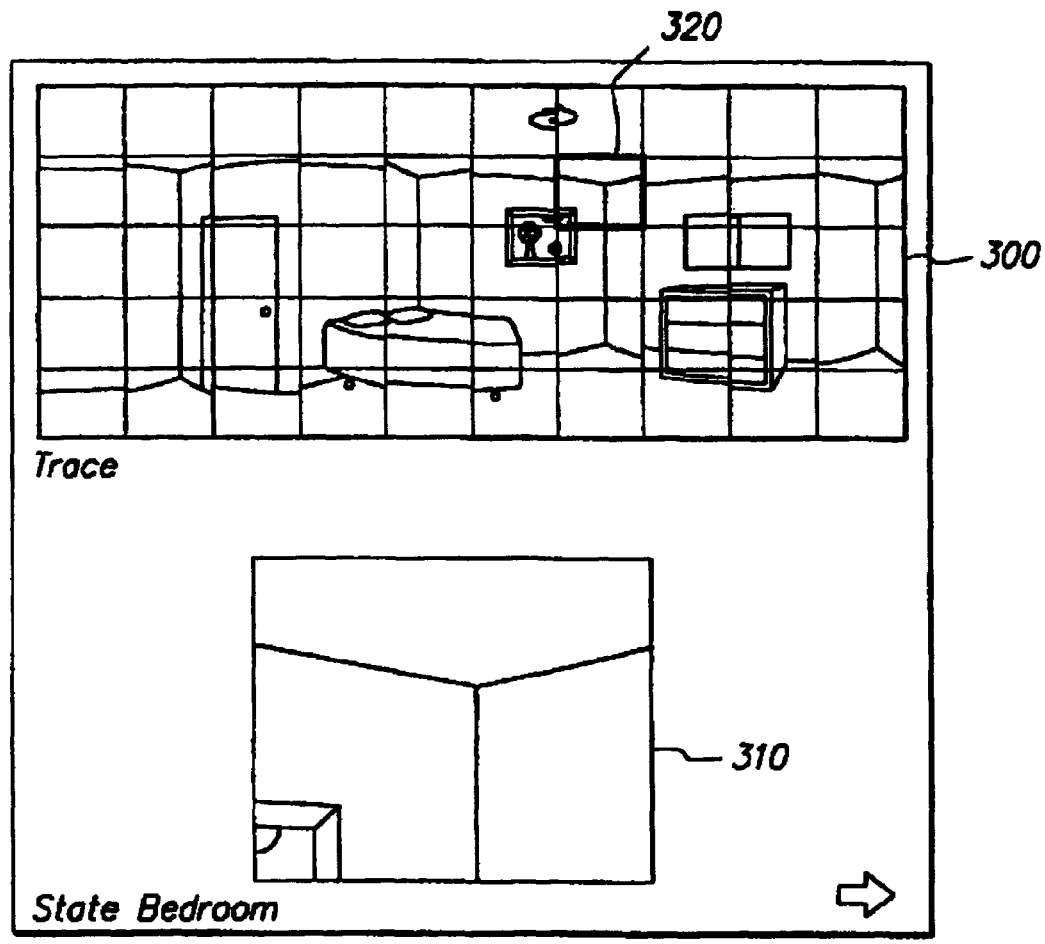
FIG. 14 illustrates a prior art overview display, a detail window and a corresponding area indicia (geometric figure outline)

FIG. 14 illustrates a prior art overview image 300, a detail window 310 and a corresponding area indicia, in this case a geometric figure outline 320. The detail window 310 corresponds to an enlarged image associated with the area bounded by the geometric figure outline 320 in the overview image 300. As the cursor is moved, the location within the overview image 300 may be highlighted utilizing the geometric figure outline 320 to clearly convey what location the detail window 310 corresponds.

One of ordinary skill in the computer arts will readily comprehend that reverse videoing the area instead of enclosing it with a geometric figure would work equally well. Differentiating the area with color could also be used without departing from the invention. A user can select any position within the overview image, press the cursor selection device's button (for example, user controls in the form of touch screen user interface buttons or icons), and an enlarged image corresponding to the particular area in the overview display is presented in the detail window 310. Thus, random access of particular frames corresponding to the overview image may be provided.

Figure 15:
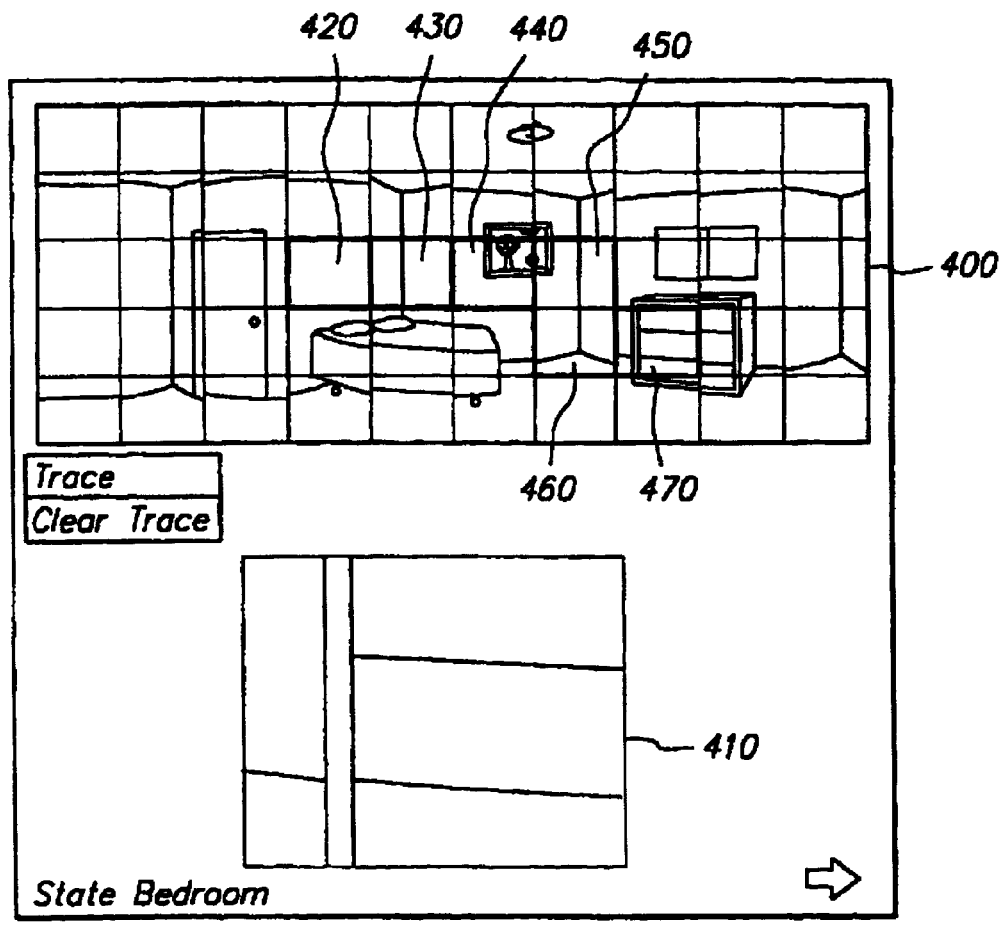
FIG. 15 depicts a prior art series of saved geometric figure outlines corresponding to user selections in tracing through an overview image display for subsequent playback, which may be utilized in accordance with embodiments of the present invention.

FIG. 15 illustrates a prior art series of saved geometric figure outlines corresponding to user selections in tracing through an overview display for subsequent playback. The overview image 400 has a detail window 410 with an enlarged image of the last location selected in the overview image 470. Each of the other cursor locations traversed in the overview image 420, 430, 440, 450 and 460 are also enclosed by an outline of a geometric figure to present a trace to the user.

Each of the cursor locations may be saved, and because each corresponds to a particular frame of the overview image, the trace of frames can be replayed at a subsequent time to allow another user to review the frames and experience a similar presentation. Locations in the detailed window and the overview image can also be selected to present other images associated with the image area, but not necessarily formed from the original image.

For example, a china teacup may appear as a dot in a china cabinet, but when the dot is selected, a detailed image rendering of the china teacup could appear in the detailed window. Moreover, a closed door appearing in an image could be selected and result in a detailed image of a room located behind the door even if the room was not visible in the previous image. Finally, areas in the detailed window can also be selected to enable further images associated with the detailed window to be revealed.

Figure 16:
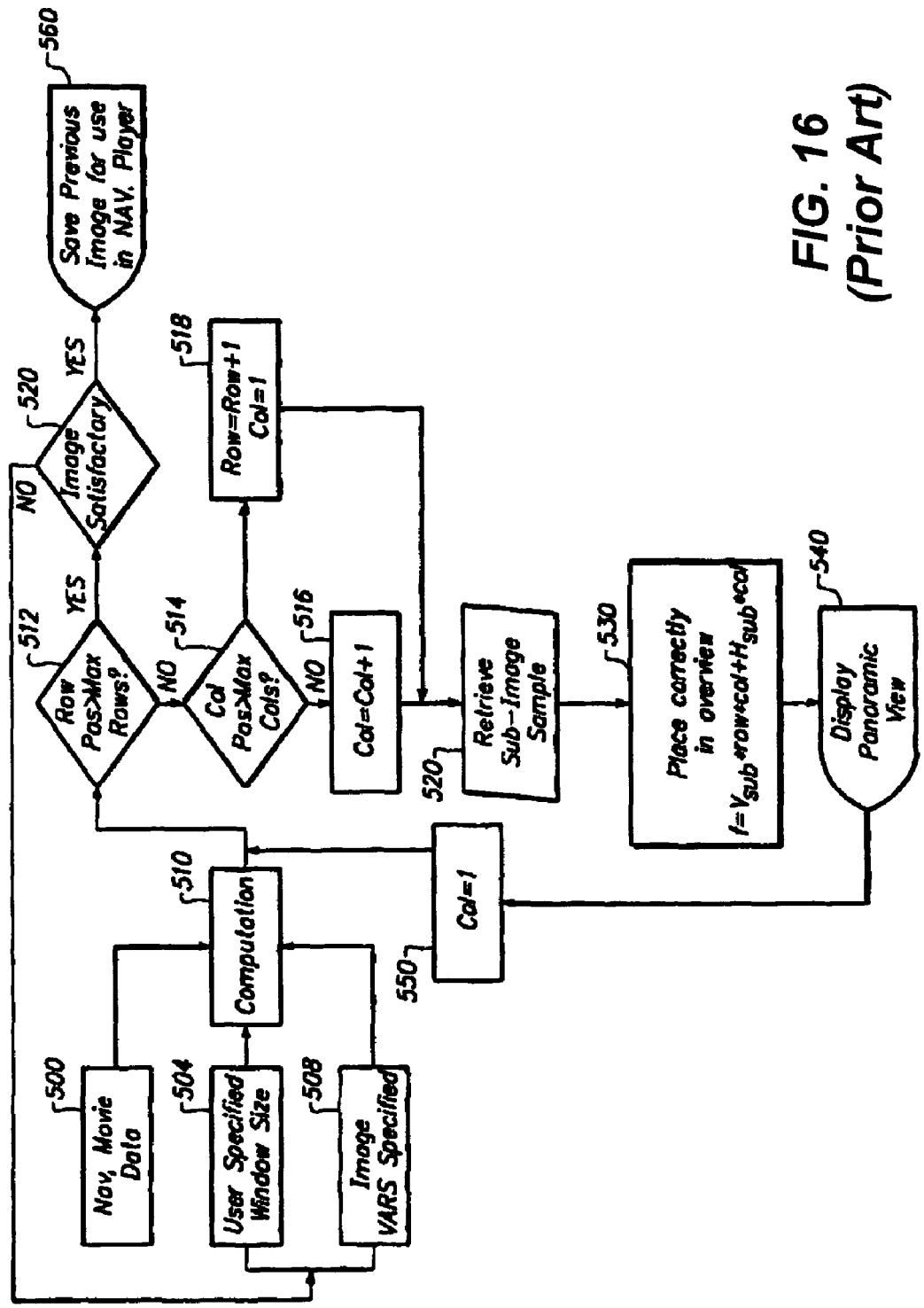
FIG. 16 is a prior art flowchart providing a logical process for building an overview image, which may be utilized in accordance with embodiments of the present invention.

Details of objects within a scene are also dependent on resolution capabilities of a camera. Cameras having appropriate resolution and/or image processing capabilities are preferably used in accordance with certain aspects of the present invention. The overview image can be created as discussed above. To assist one of ordinary skill in the art to make and use the invention, a more detailed discussion of the necessary processing is presented below with reference to FIG. 16 and FIG. 17 herein FIG. 16 depicts a prior art flowchart providing a logical process for building an overview image display. Such a logical process may be utilized in accordance with the present invention, but is not a necessary feature of the present invention. Those skilled in the art will appreciate that such a logical process can merely an example of one type of image-processing algorithm that may be utilized in accordance with embodiments of the present invention. For example, such a logical process may be implemented as a routine or subroutine that runs via image-processing unit 35 of FIG. 1 in a hand held device. Those skilled in the art can appreciate that the logical process described with relation to FIGS. 16 and 17 herein are not limiting features of the present invention.

Such logical processes, rather, are merely one of many such processes that may be utilized in accordance with the present invention to permit a user to manipulate video images displayed via a display screen of a hand held device. Navigable movie/video data in the form of images input to the hand held device to form individual images can be thus processed, as illustrated at function block 500. User specified window size (horizontal dimension and vertical dimension) may be entered, as illustrated at function block 504.

Image variables can be specified (horizontal sub-sampling rate, vertical sub-sampling rate, horizontal and vertical overlap of individual frame images, and horizontal and vertical clip (the number of pixels are clipped from a particular frame in the x and y plane)), as depicted at function block 508. Function blocks 500, 504 and 508 are fed into the computation function block 510 where the individual frames are scaled for each row and column, and the row and column variables are each initialized to one.

Then a nested loop can be invoked to create the overview image. First, as indicated at decision block 512, a test is performed to determine if the maximum number of rows has been exceeded. If so, then the overview image is tested to determine if its quality is satisfactory at decision block 520. If the quality is insufficient, the user may be provided with an opportunity to adjust the initial variables, as illustrated at function blocks 504 and 508. The processing is then repeated. If, however, the image is of sufficient quality, it can be saved and displayed for use, as depicted at block 560.

If the maximum rows have not been exceeded as detected in decision block 512, then another test can be performed, as illustrated at decision block 514, to determine if the column maximum has been exceeded. If so, then the row variable can be incremented and the column variable can be reset to one at function block 518 and control flows to input block 520. If the column maximum has not been exceeded, then the column variable may be incremented and the sub-image sample frame can be retrieved, as depicted at input block 520. Then, as illustrated at function block 530, the frame may be inserted correctly in the overview image.

The frame may be inserted at the location corresponding to (Vsub*row*col)+Hsub*col; where row and col refer to the variables incremented in the nested loop, and Vsub and Hsub are user specified variables corresponding to the horizontal and vertical sub sampling rate. Finally, the incremental overview image can be displayed based on the newly inserted frame as depicted at display block 540. Thereafter, the column variable can be reset to one and processing can be passed to decision block 512.

A computer system corresponding to the method and system depicted in FIGS. 11 to 17 may be generally interactive. A user may guess at some set of parameters, build the overview image, and decide if the image is satisfactory. If the image is not satisfactory, then variables can be adjusted and the image is recreated. This process can be repeated until a satisfactory image result, which may be saved with its associated parameters. The picture and the parameters can be then input to the next set of logic.

Such features may or may not be present with the hand held device itself. For example, images may be transmitted from a transmitter, such as data transmitter 112 of FIG. 7, and subroutines or routines present within the server itself may utilize predetermined sets of parameters to build the overview image and determine if the image is satisfactory, generally at the request of the hand held device user. A satisfactory image can be then transmitted to the hand held device. Alternatively, image-processing routines present within an image-processing unit integrated with the hand held device may operate in association with routines present within the server to determine if the image is satisfactory, and/or to manipulate the image (e.g., pan, zoom).

Figure 17:
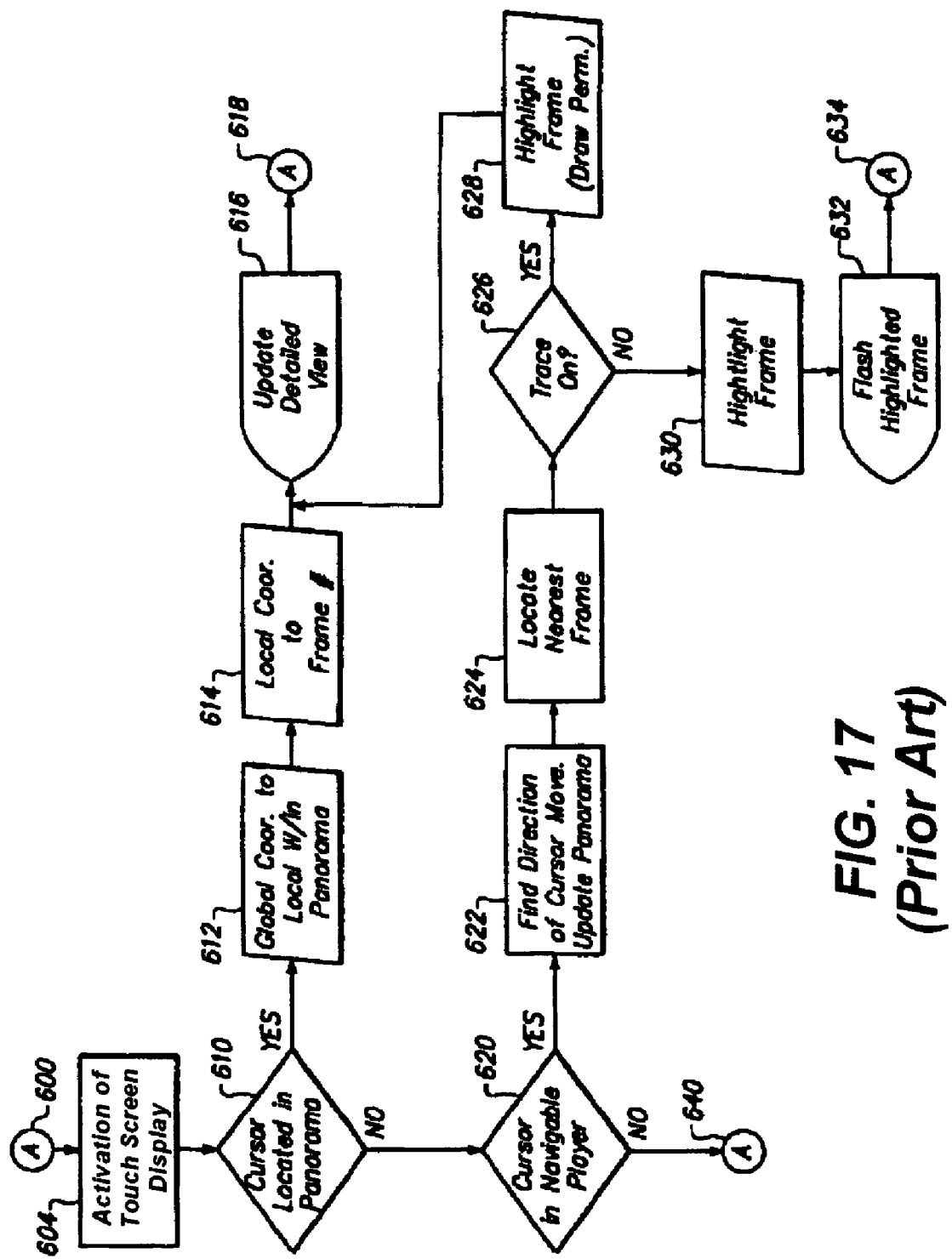
FIG. 17 illustrates a prior art flowchart illustrative of a logical process for playback interaction, which may be utilized in accordance with embodiments of the present invention.

FIG. 17 depicts a prior art flowchart illustrative of a logical process for playback interaction. The logical process illustrated in FIG. 17 may be utilized in accordance with embodiments of the present invention. Playback interaction may commence, as illustrated at label 600, which immediately flows into function block 604 to detect if user controls have been activated at the hand held device. Such user controls may be configured as external user controls on the hand held device itself (e.g., buttons, etc.), or via a touch screen user interface integrated with hand held device display screen.

When a touch screen user input or user control button press is detected, a test can be performed to determine if a cursor is positioned in the overview portion of the display. If so, then the global coordinates can be converted to overview image coordinates local to the overview image as shown in output block 612. The local coordinates can be subsequently converted into a particular frame number as shown in output block 614. Then, the overview image is updated by displaying the frame associated with the particular location in the overview image and control flows via label 600 to function block 604 to await the next button press.

If the cursor is not detected in the overview image as illustrated at decision block 610, then another test may be performed, as indicated at decision block 620, to determine if the cursor is located in the navigable player (detail window). If not, then control can be passed back via label 600 to function block 604 to await the next user input. However, if the cursor is located in the detail window, then as depicted a function block 622, the direction of cursor movement may be detected. As depicted at function block 624, the nearest frame can be located, and as illustrated at decision block 626, trace mode may be tested.

If trace is on, then a geometric figure can be displayed at the location corresponding to the new cursor location in the overview image. The overview image may be then updated, and control can be passed back to await the next user input via user controls at the hand held device and/or a touch screen user interface integrated with the hand held device. If trace is not on, the particular frame is still highlighted as shown in function block 630, and the highlight can be flashed on the overview image as illustrated at output block 632. Thereafter, control may be returned to await the next user input.

Although the aforementioned logical processes describe the use of a cursor as a means for detecting locations in a panorama, those skilled in the art can appreciate that other detection and tracking mechanisms may be utilized, such as, for example, the pressing of a particular area within a touch screen display.

Figure 18:
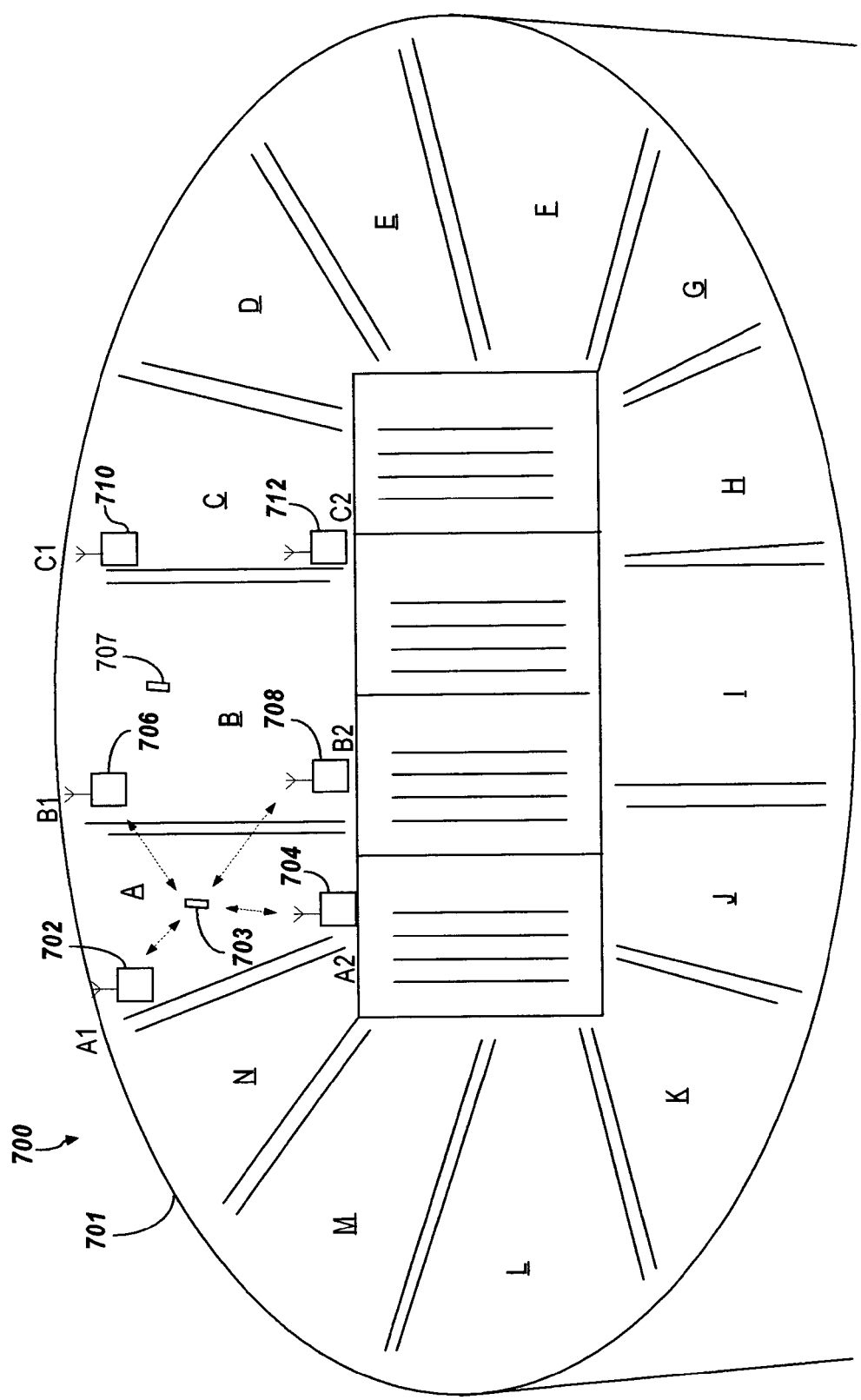
FIG. 18 depicts a pictorial representation illustrative of a Venue Positioning System (VPS) in accordance with embodiments of the present invention.

FIG. 18 depicts a pictorial representation illustrative of a Venue Positioning System (VPS) 700 in accordance with embodiments of the present invention. FIG. 18 illustrates a stadium venue 701, which is divided according to seats and sections. Stadium venue 701 may be utilized for sports activities, concert activities, political rallies, or other venue activities. Stadium venue 701 is divided, for example, into a variety of seating sections A to N. For purposes of simplifying this discussion, VPS 700 is described in the context of sections A to C only.

A venue positioning system (VPS) device 704 is positioned in section A of stadium venue 701, as indicated at position A2. A VPS device 702 is located within section A at position A1. In the illustration of FIG. 18, it is assumed that VPS device 702 is located at the top of a staircase, while VPS device 704 is located at the bottom of the staircase, and therefore at the bottom of section A, near the sports field 711. A VPS device 706 is located near the top of section B at position B1. A VPS device 708 is located at the bottom of section B at position B2, near sports field 711. Similarly, in section C, venue-positioning devices 710 and 712 are respectively located at positions C1 and C2.

A hand held device 703 may be located at a seat within section A. For purposes of this discussion, and by way of example only, it is assumed that hand held device 703 is being operated by a stadium attendee watching a sporting event or other venue activity taking place on sports field 711. A hand held device 707 is located within section B. Hand held device 707, by way of example may also be operated by a concessionaire or venue employee.

If the user of hand held device 703 desires to order a soda, hot dog, or other product or service offered by venue operators during the venue event, the user merely presses an associated button displayed via a touch screen user interface integrated with the hand held device. A signal is transmitted by hand held device 703, in response to the user input to/through the VPS device, wireless network or wireless gateway as previously described. One or more of VPS devices 702, 704, 706, and 708 may detect the signal. The VPS devices may also operate merely as transponders, in which case hand held devices will be able to determine their approximate location within the venue and then transmit position information through wireless means to, for example, concession personnel.

VPS devices 702, 704, 706, and 708 function in concert with one another to determine the location of hand held device 703 within section A. Triangulation methods, for example, may be used through the hand held device or VPS devices to determine the location of the hand held device within the venue. This information is then transmitted by one or more of such VPS devices either directly to hand held device 707 or initially through a wireless network, including a wireless gateway and associated server, and then to hand held device 707. The user of hand held device 707 then can directly proceed to the location of hand held device 703 to offer concession services.

Additionally, hand held device 703 can be configured with a venue menu or merchandise list. In response to requesting a particular item from the menu or merchandise list, the request can be transmitted as wireless data from hand held device 703 through the wireless network to hand held device 707 (or directly to a controller (not shown) of hand held device 707) so that the user (concession employee) of hand held device 707 can respond to the customer request and proceed directly to the location of hand held device 703 used by a customer.

Figure 19:
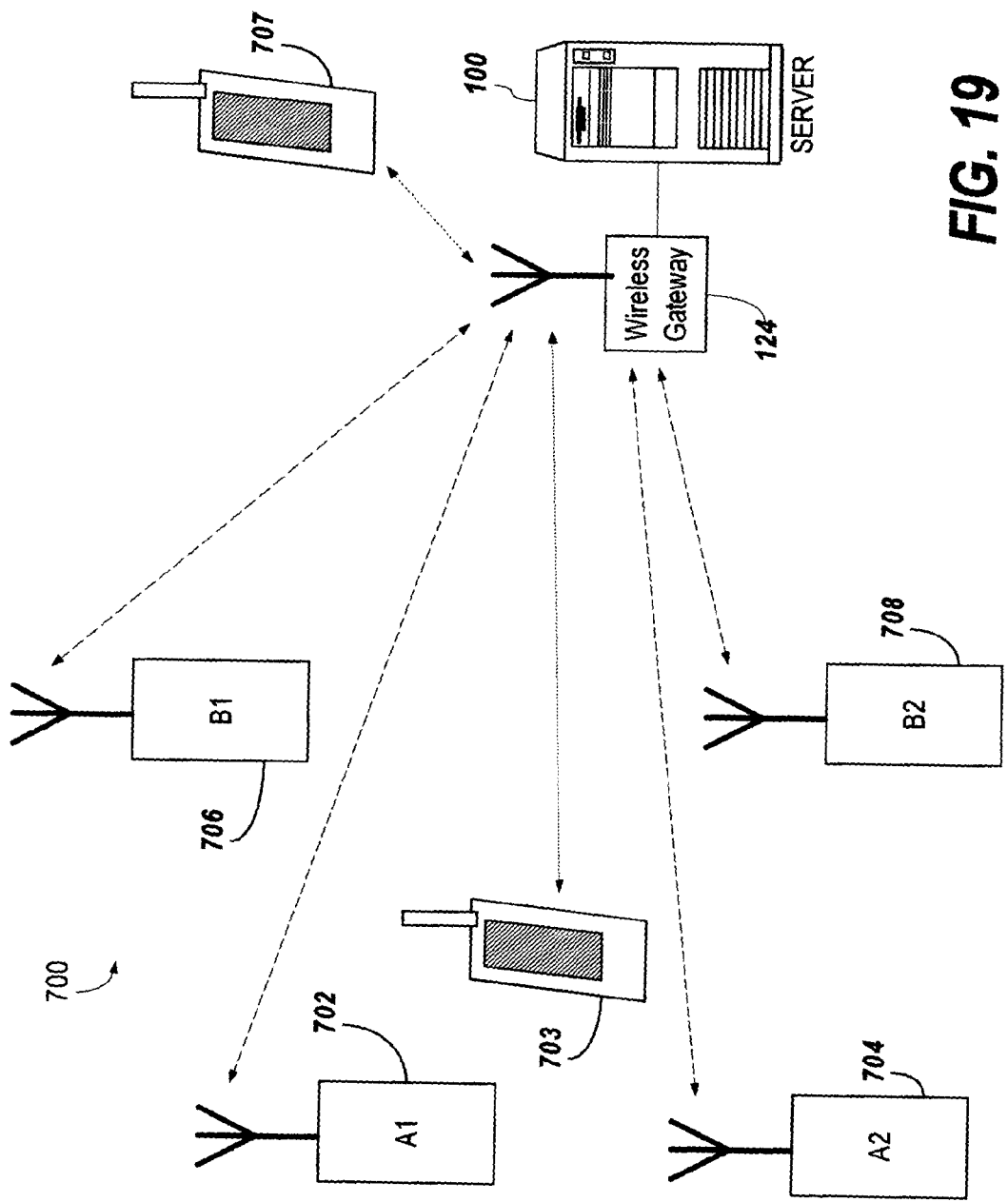
FIG. 19 illustrates in greater detail the Venue Positioning System (VPS) of FIG. 18 in accordance with embodiments of the present invention.

FIG. 19 illustrates in greater detail the VPS 700 of FIG. 18, in accordance with embodiments of the present invention. In FIG. 18 and FIG. 19 like or analogous parts are indicated by identical reference numerals, unless otherwise stated. Additionally wireless gateway 124 and server 100 of FIG. 19 are analogous to the wireless gateway 124 and server 100 illustrated in FIG. 8. Venue positioning units 702, 704, 706, and 708 are located within section A and section B. A wireless gateway 124 is linked to server 100. Wireless gateway 124 can communicate with hand held device 707 and hand held device 703.

Wireless gateway 124 can also communicate with VPS devices 702, 704, 706, and 708 if the VPS devices are also operating as data communication devices in addition to providing mere transponder capabilities. When VPS devices 702, 704, 706, and 708 detect the location of hand held device 703 within stadium venue 701, the location is transmitted to wireless gateway 124 and thereafter to hand held device 703. It should be appreciated that a hand held device user may also identify his/her location in a venue by entering location information (e.g., seat/section/row) on the hand held device when making a request to a service provider such as a food concession operation.

The VPS devices will still be useful to help concession management locate concession employees located within the venue that are in closest proximity to the hand held device user. A wireless gateway 124 and server 100 can be associated with a wireless network implemented in association with stadium venue 701. Those skilled in the art will appreciate that such a wireless network may be limited geographically to the stadium venue 701 and the immediate surrounding area. An example of such a wireless network, as described previously is a Bluetooth based wireless network.

The hand held devices themselves may be proprietary devices owned by promoters or operators of stadium venue 701 and rented to patrons for their use while attending a venue activity. Proprietary devices will generally be manufactured using durable materials (e.g., similar to those materials used on field technician digital multimeters/devices such as the Fluke™ line of electronic devices). Proprietary devices will also be limited in hardware and software modules (i.e., software routines/subroutines) needed for communication with the venue system in order to display venue activities to temporary users.

Hand held devices may also be owned by the patrons themselves that they bring into the stadium venue for their use by permission of the venue promoter or stadium owners in return for the payment of a fee by the patron. In return for the fee, the venue promoter or stadium owner can provide the patron with a temporary code, which permits them to access, the wireless transmissions network and associated with the venue itself, such as wireless network 152 described herein. Patron-owned devices may utilize modules (e.g., smart card technology to receive authorization (e.g., frequency or codes) needed to receive venue—provided video/data. Authorization may also be transferred to the patron-owned device via IR or short-range RF means. Wireless network 152 described herein may be configured as a proprietary wireless Intranet/Internet providing other data accessible by patrons through their hand held devices.

Figure 20:
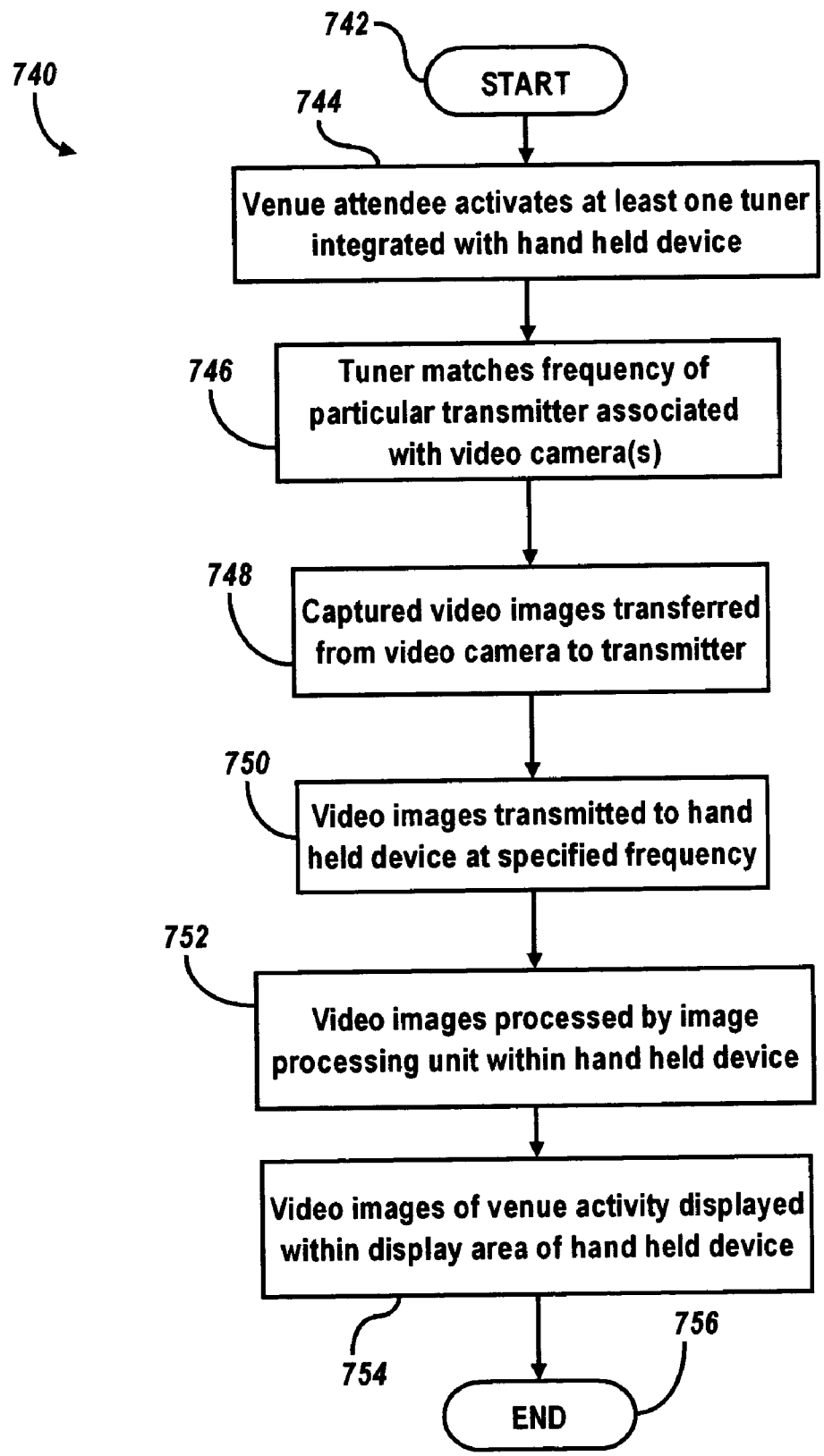
FIG. 20 depicts a flowchart of operations illustrative of a method for providing multiple venue activities through a hand held device in accordance with embodiments of the present invention.

FIG. 20 depicts a flowchart of operations 740 illustrative of a method for providing multiple venue activities through a hand held device, in accordance with embodiments of the present invention. The process is initiated, as depicted at block 742. As illustrated next at block 744, a venue attendee may activate at least one hand held tuner integrated with a hand held device, such as the hand held device illustrated in FIG. 4. At least one tuner may be integrated with the hand held device, although more than one tuner (or other simultaneous signal receiving capability) may be used within a hand held device in support of other embodiments of the invention previously described.

The tuner, or tuners, is/are associated with transmission frequency/frequencies of a transmitter that may be linked to a particular camera/cameras focusing on a venue activity, or to a wireless gateway or wireless network transmission. To view images from a particular angle, the user can retrieve the video images from the camera associated with that particular perspective. The user may have to adjust a tuner until the right frequency/image is matched, as indicated at block 756. As illustrated at block 748, captured video images are transferred from the video camera to the transmitter associated with the camera, or a server in control of the camera(s). Video images are thus generally transmitted to the hand held device at the specified frequency, either in response to a user request at the hand held device, as depicted at block 750 or as a broadcast.

An image-processing unit integrated with the hand held device, as illustrated at block 752 may process transferred video images. An example of such an image-processing unit is image-processing unit 35 of FIG. 1. As indicated thereafter at block 754, the video images of the venue activity captured by the video camera can be displayed within a display area of the hand held device, such as display 18 of FIG. 1. The process can then terminate, as illustrated at block 756 when the user no longer desires to view the perspective.

FIG. 21 illustrates a flowchart of operations 770 illustrative of a method for providing multiple venue activities through a hand held device from one or more digital video cameras, in accordance with embodiments of the present invention. When a user of a hand held device can interact with the venue system, as indicated at block 772, the process is initiated. As illustrated next at block 774, video images of a venue activity may be captured by one or more digital video cameras.

Such digital video cameras may be panoramic/wide-angle in nature and/or configured as high definition/resolution video cameras, well known in the art. The video camera or cameras may be respectively linked to data transmitters, such as data transmitters 102, 104, 106, and/or 108 of FIG. 5 or data transmitter 112 of FIG. 6 to FIG. 9 herein. As depicted next at decision block 778, if a user does not request a view of the venue activity through the hand held device, the process terminates (i.e., with respect to that use), as illustrated thereafter at block 779.

If, as illustrated at decision block 778, the user can request a view of the venue activity through the hand held device, then as described thereafter at block 780, video data may be transferred from a data transmitter to a server, such as server 100 of FIG. 5 to FIG. 8 herein. The video data may be stored in a memory location of the server or a plurality of servers, as indicated at block 782. The video data may be then transferred to a wireless data transmitter/receiver integrated with the hand held device, as indicated at block 784.

As illustrated thereafter at block 786, the video data may be processed by an image-processing unit and associated image-processing routines and/or subroutines integrated with the hand held device. When image processing is complete, the video images may be displayed in a display area of the hand held device. As illustrated next at block 790, if a user chooses to pan/zoom for a better view of the video images displayed within the hand held device, then two possible operations may follow, either separately or in association with one another.

The image-processing unit integrated with the hand held device may process a user's pan/zoom request, as illustrated at block 792. Alternatively, image-processing routines and/or subroutines resident at the server or a plurality of servers may process the user's pan/zoom request, following the transmission of the user's request from the hand held device to the server or plurality of servers. Such a request may be transmitted through a wireless gateway linked to the server or servers.

Image processing may occur at the server or servers if the hand held device is not capable of directly processing the video data and video images thereof due to low memory or slow CPU allocation. Likewise, some image-processing may take place within the hand held device, while video image-processing requiring faster processing capabilities and increased memory may take place additionally at the server or servers to assist in the final image representation displayed at the hand held device.

When image processing is complete, the pan/zoomed images can be displayed within a display screen or display area of the hand held device, as illustrated thereafter at block 796. The process then terminates, as depicted at block 798. If the user does not request pan/zoom, as indicated at block 790, the process may then terminate, as described at block 791.

Figure 22:
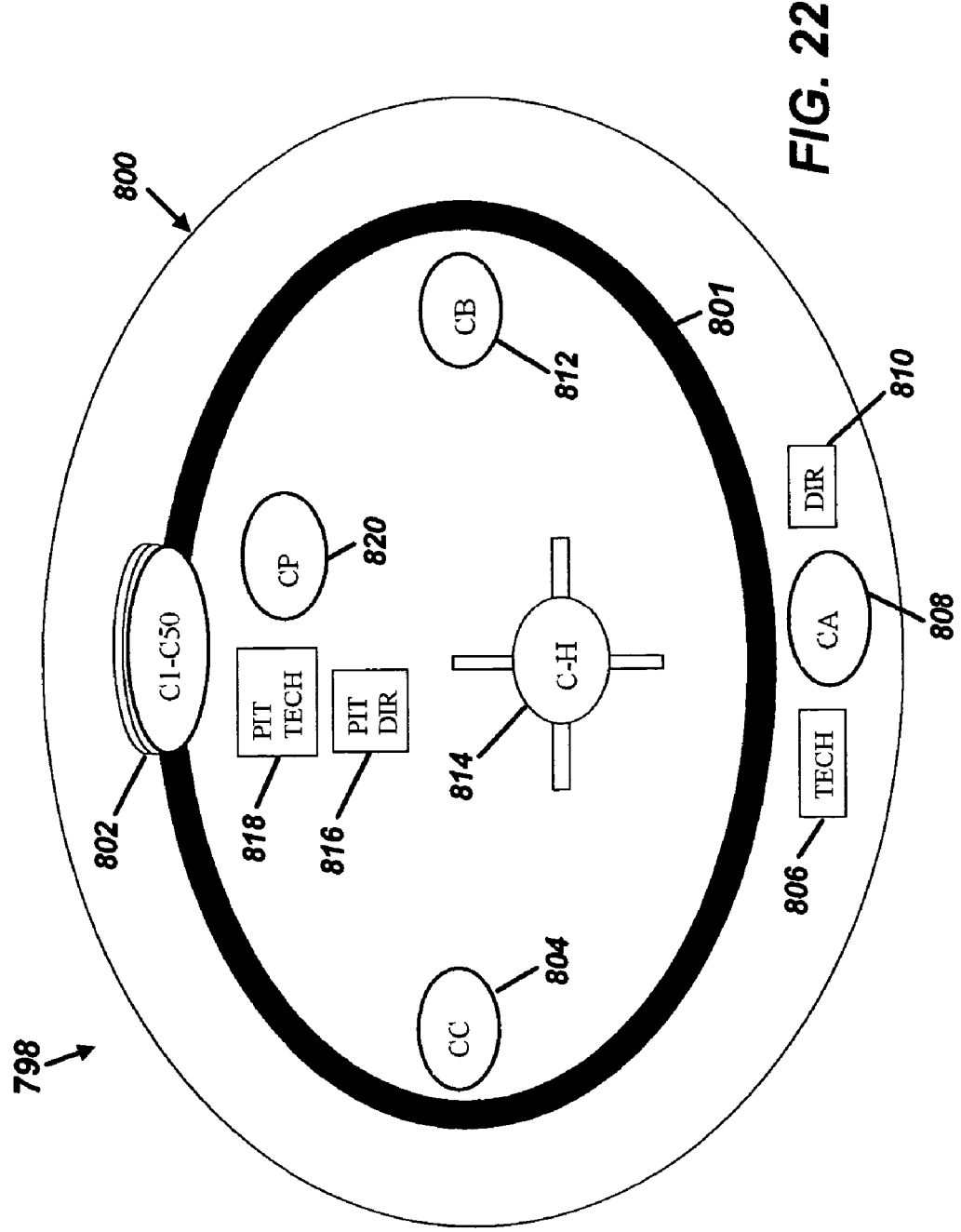
FIG. 22 depicts a block diagram illustrative of a racetrack deployment, which may be implemented in accordance with an embodiment of the present invention.

FIG. 22 depicts a block diagram 798 illustrative of a racetrack deployment of multimedia solutions, which may be implemented in accordance with an embodiment of the present invention. Generally, a racetrack 801 may be configured within a racing venue or racing stadium. An example of a racetrack in which the present invention disclosed herein may be implemented is a NASCAR® racing stadium. NASCAR® is a registered trademark of the National Association for Stock Car Auto Racing, Inc., P.O. Box 2875, Daytona Beach, Fla. 32120-2875.

In accordance with the methods and system of the present invention, vehicle "in-play" cameras can be located within vehicles C1 to C50, as indicated at block 802. Such in-play cameras can provide data wireless through communication means already discussed herein. A main camera perspective can be provided by camera 808 (i.e., CA). A first turn perspective can be provided by camera 812 (i.e., CB). Additionally, a second turn perspective can be provided by camera 804 (i.e., CC). A PIT camera 820 (i.e., CP) can also provide a racing pit perspective. A helicopter camera 814 (i.e., C-H) can also be positioned within a helicopter flaying above stadium 800.

Figure 23:
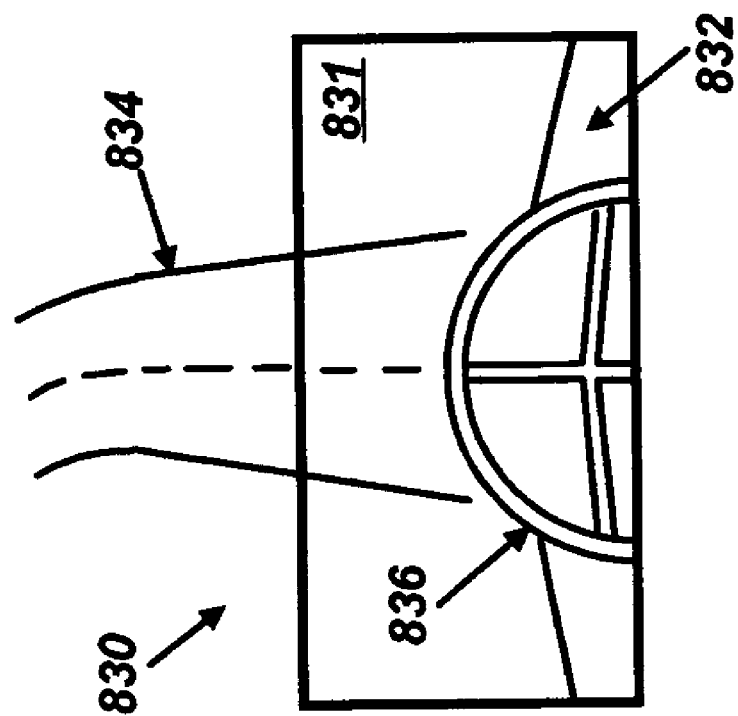
FIG. 23 illustrates a pictorial diagram of an in-play camera view of a racetrack deployment, which may be implemented in accordance with an embodiment of the present invention.

A system technician 806 (i.e., TECH) can work in concert with a director 810 (i.e., DIR). Director 810 is generally a media/technical director. A pit technician 818 (i.e., PIT TECH) can be located near a bit director 816 (i.e., PIT DIR). The following index summarizes the roles of various cameras and individuals indicated in FIG. 22:

C1-C50—Vehicle "In-play" Cameras
CA—Main Camera Perspective
CB—First Turn Perspective
CC—Second Turn Perspective
CP—PIT Camera
C-H—Helicopter Camera
TECH—System technician
PIT TECH—Pit technician
DIR—Media/Technical Director
PIT DIR—Pit Director FIG. 23 illustrates a pictorial diagram 830 of an in-play camera view of a racetrack deployment, which may be implemented in accordance with an embodiment of the present invention. Such an in-play camera view can be obtained from a camera located within a racing car within stadium 800 of FIG. 22. Examples of such racing cars are illustrated in FIG. 22 at block 802 (i.e., racing cars C1 to C50). As depicted in FIG. 23, the driver of a racing car can view a racing track 834 (i.e., a view of track 801 of FIG. 22) through a car window 831. The driver can generally view a racing car dashboard 832 and steering wheel 836. Such a view can be broadcast real-time via a camera located within the racing car. Such a view can be broadcast real-time and transmitted from the camera located within the racing car through a wireless communications network to a hand held device 838, which is illustrated in FIG. 24.

Figure 24:
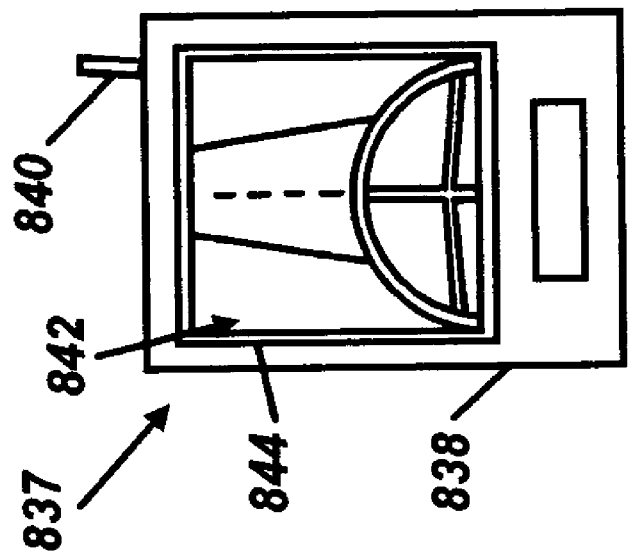
FIG. 24 depicts a pictorial view of a hand held device and a display area having an in-play view of the racetrack deployment indicated in FIG. 23, in accordance with an embodiment of the present invention.

FIG. 24 depicts a pictorial view 837 of hand held device 838 and a display area 844 having an in-play view of the racetrack deployment indicated in FIG. 23, in accordance with an embodiment of the present invention. Hand held device 838 is analogous to hand held devices illustrated in FIGS. 2 and 3 herein. Hand held device 838 of FIG. 24 is also analogous to hand held device 60 of FIGS. 4 to 9 herein. Hand held device 838 can receive and transmit data to and from a wireless communications network, such as, for example, network 152, which is depicted in FIG. 10 herein. Thus, the in-play camera view obtained from racing cameras, such as indicated in FIG. 23, can be transmitted through a wireless communications network real-time to hand held device 838 and displayed on display area 844 for a user of the hand held device 838 to view.

Hand held device 838 also generally includes an antenna 840. Those skilled in the art can appreciate that antenna 840 can be integrated within hand held device 838 and is presented as an external attachment or appendage to hand held device 838 for illustrative purposes only. View 842 displayed within display area 844 can thus be obtained from a camera positioned within a racing car, as indicated in FIGS. 22 and 23. Hand held device 838 can be configured to include video recording capabilities. Thus, a user of had held device 838 may desire to record a view obtained by a camera (e.g., cameras illustrated in FIG. 22).

Thus, in-play camera views may be wirelessly transmitted from at least one camera located at an in-play location within a venue (e.g., a racing venue) to enterprise equipment, wherein the views can then be processed for display on a display screen associated with the hand held device. It should be appreciated by those skilled in the art that camera views can also be transmitted for receipt directly by hand held devices. Thereafter, the in-play camera view can be displayed on the display screen, thereby enabling a user of the hand held device to view the in-play camera view through the hand held device.

Figure 25:
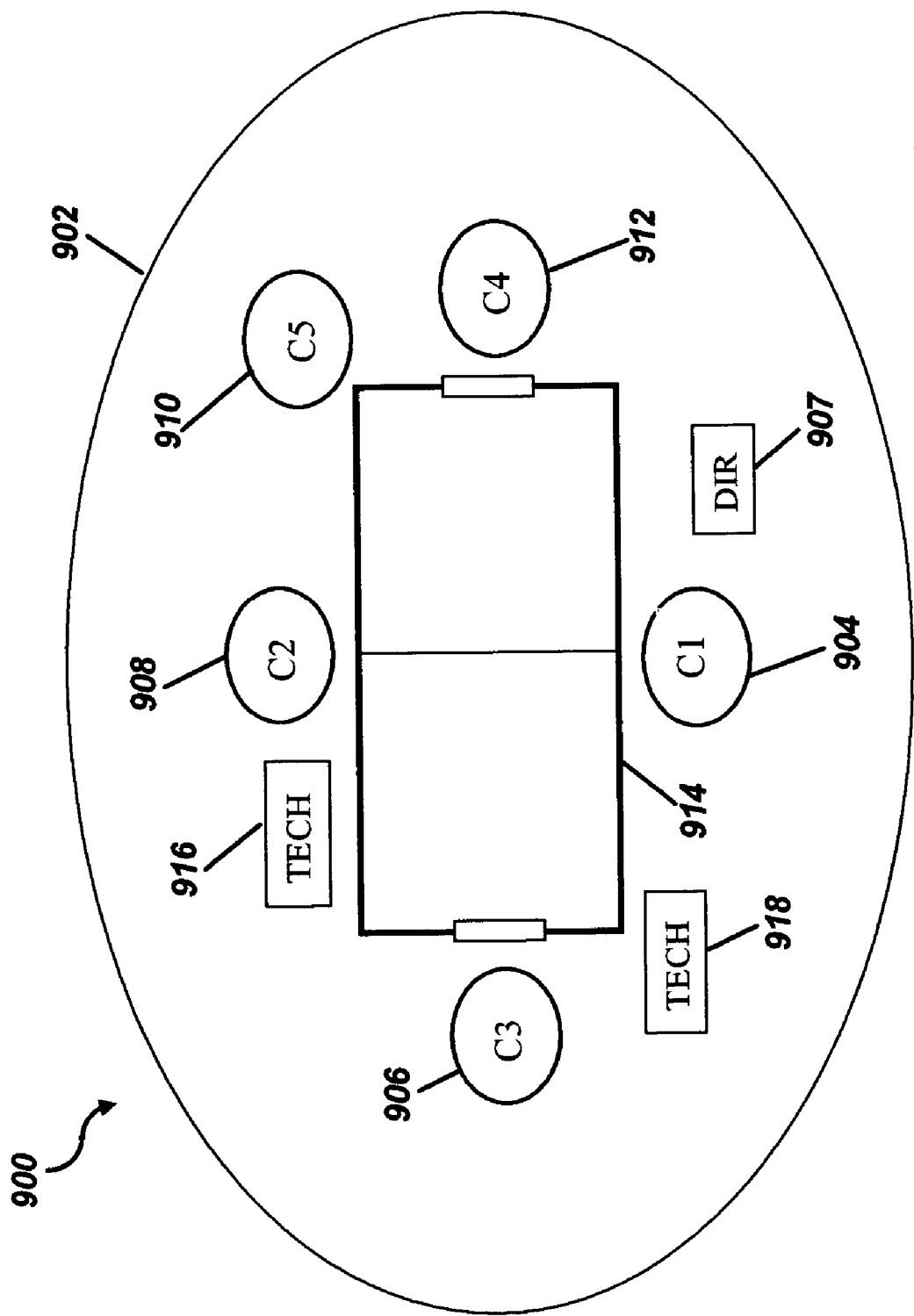
FIG. 25 illustrates a block diagram illustrative of a sports venue deployment, which may be implemented in accordance with an alternative embodiment of the present invention.

The in-play camera view can be transmitted from enterprise equipment and/or at least one camera to the hand held device in response to a particular user input and/or selection. In addition, a particular in-play camera view transmitted from at least one camera can be recorded, in response to a particular user input. Such in-play camera views can also be stored in a memory associated with the hand held device or within storage media (e.g., a memory stick or memory disk or other storage media), in response to a particular input and/or selection. Although the in-play camera location can comprise, for example, a placement within at least one racing car competing within a racing venue, it should be appreciated form the foregoing disclosure that the in-play camera can be utilized in other venue related applications, such as, for example, horse racing, football, soccer, etc. For example, an in-play camera can be integrated with a helmet or other equipment associated with the activity. Video obtained from such in-play cameras FIG. 25 illustrates a block diagram 900 illustrative of a sports venue deployment, which may be implemented in accordance with an alternative embodiment of the present invention. A sports stadium 902 includes a playing field 914 about which various cameras can be positioned to obtain perspective video views for broadcast to wireless hand held devices located within the stadium or outside of the stadium. Camera 904 (i.e. C1) can provide a main center camera perspective. Camera 908 (i.e., C2) can provide an opposite center perspective (i.e., opposite camera 904). Camera 906 (i.e., C3) can provide a home team goal view. Camera 912 (i.e., C4) can provide a visiting team goal view.

Figure 26:
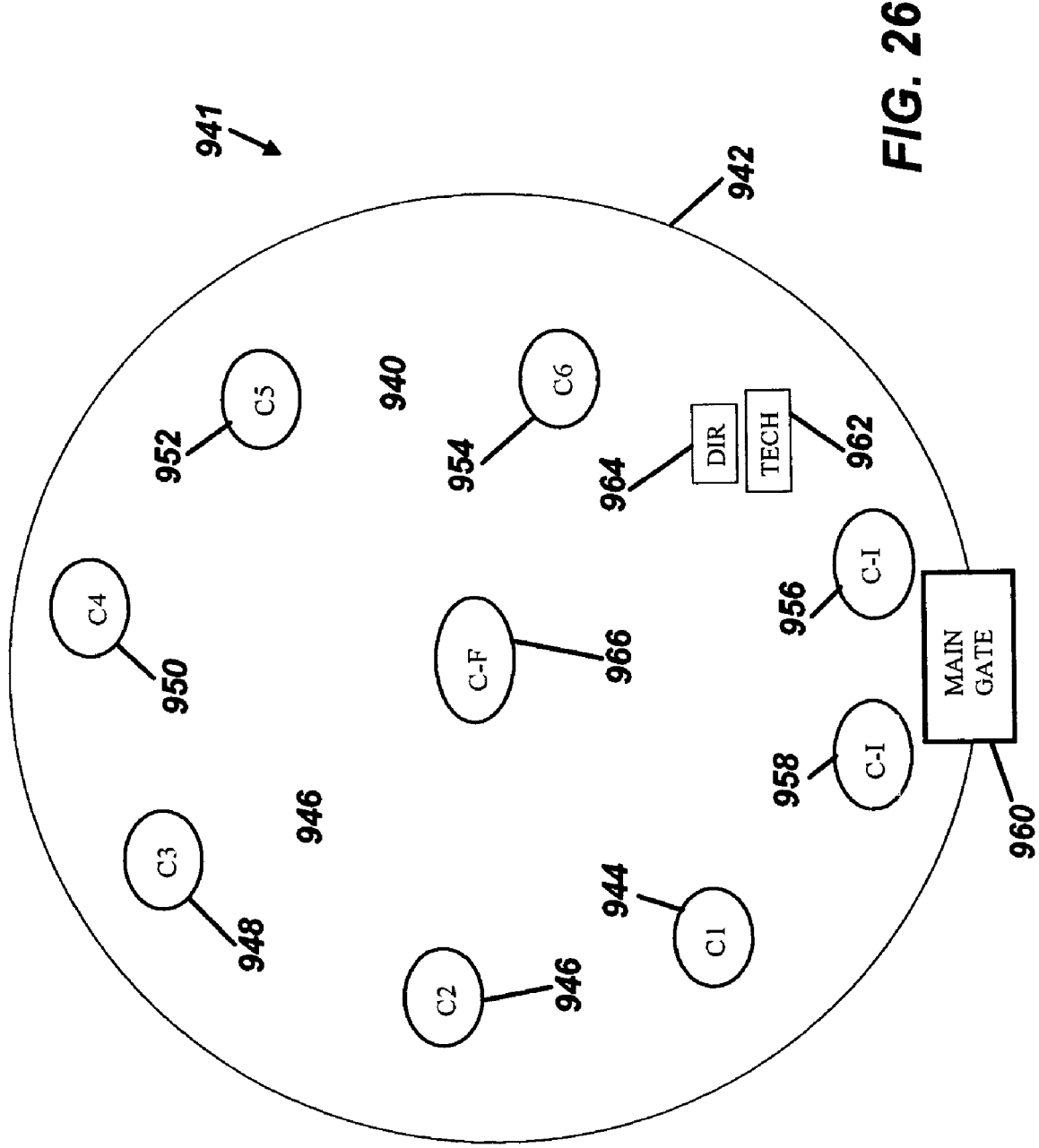
FIG. 26 depicts a block diagram illustrative of a village deployment, which may be implemented in accordance with an alternative embodiment of the present invention.

Camera 910 (i.e., C4) can provide a roaming "fan CAM" view. A systems technician 918 (i.e., TECH) can function in concert with a media/technical director (i.e., DIR) 907. Cameras C1 to C5 indicated in FIG. 25 thus generally can comprise in-play cameras. Video obtained from such in-play cameras can be transmitted from such in-play cameras for display on a display associated with a hand held device. The following generally summarizes the deployment illustrated in FIG. 25:

C1—Main Center Camera Perspective
C2—Opposite Center Perspective
C3—Home Team Goal View
C4—Visiting Team Goal View
C5—Roaming "Fan CAM"
TECH—System technicians
DIR—Media/Technical Director FIG. 26 depicts a block diagram 941 illustrative of a village 942 deployment, which may be implemented in accordance with an alternative embodiment of the present invention. An example of a "village" is an amusement park, entertainment complex or golf course, wherein the real estate hosting entertainment activities is large and terrain varied. As illustrated in FIG. 26, cameras 944, 946, 948, 950, 952, and 954 (i.e., cameras C1 to C6) can provide activity/show perspectives. Cameras 958 and 956 (i.e., C-I) can provide INFO channels which may broadcast particular village information for display on a hand held device, such as, for example, hand held device 838 discussed earlier.

Village 42 can include a main gate 960 through which village attendees may pass prior to entry to village 942. One or more system technicians 962 (TECH) may be located within village 942 to work in concert with a media/technical director 964 (i.e., DIR). One or more roaming "Fan CAM" cameras 966 (i.e., Fan CAM) may also be located within village 942 to provide roaming video views which may be picked up by hand held devices in communication with a wireless communications network associated with village 941. Cameras C-1, C-F and C1 to C6 illustrated in FIG. 26 thus generally can comprise in-play cameras. Video obtained from such in-play cameras can be transmitted from such in-play cameras for display at one or more hand held devices. The following generally summarizes the deployment illustrated in FIG. 26:

C-I—INFO Channels
C1-C6—Activity/Show Perspectives
C-F—Roaming "Fan CAM"
TECH—System technicians
DIR—Media/Technical Director It should be appreciated that village 42 can also include or be implemented as a golf course. The main gate 960 through which golf attendees may pass prior to entry to golf course 942 may include a clubhouse, pro-shop or other facilities, such as those available at typical country clubs. One or more system technicians 962 (TECH) may be located within golf course 942 to work in concert with a media/technical director 964 (i.e., DIR). One or more roaming "Fan CAM" cameras 966 (i.e., Fan CAM) may also be located within golf course 942 to provide roaming video views of attendees at a tournament, views which may be picked up by remote viewers in communication with a wireless communications network associated with village 941.

Cameras C-1, C-F and C1 to C6 illustrated in FIG. 26 can be implemented as in-play cameras assigned to specific championship golfers, which would allow viewing fans to monitor more than one pro golfer at a time user a remote viewer. It should be appreciated that more than one in-play camera can be used in a golf course or golf course event. Eighteen in-play cameras can be assigned to each hole at an event. Or one in-play camera can be assigned to each pro golfer. Thirty six cameras may be deployed, for example, one at the "tee-box" area and another near the "putting green" for each hole.

All video obtained from the cameras, including in-play cameras, can be assigned a unique channel, which can be received directly from hand held devices (e.g., PDAs, cellular telephones, etc.) having complimentary RF receivers, or the camera signals can be m received and managed by a server prior to rebroadcast. Upon rebroadcast, each camera can be assigned a unique frequency or IP address for data management purposes and for ease of identification and assignment when received by remote viewers, enabling users to easily find and select camera view for viewing. Rebroadcast can be transmitted from such in-play cameras for display at one or more hand held devices.

Figure 27:
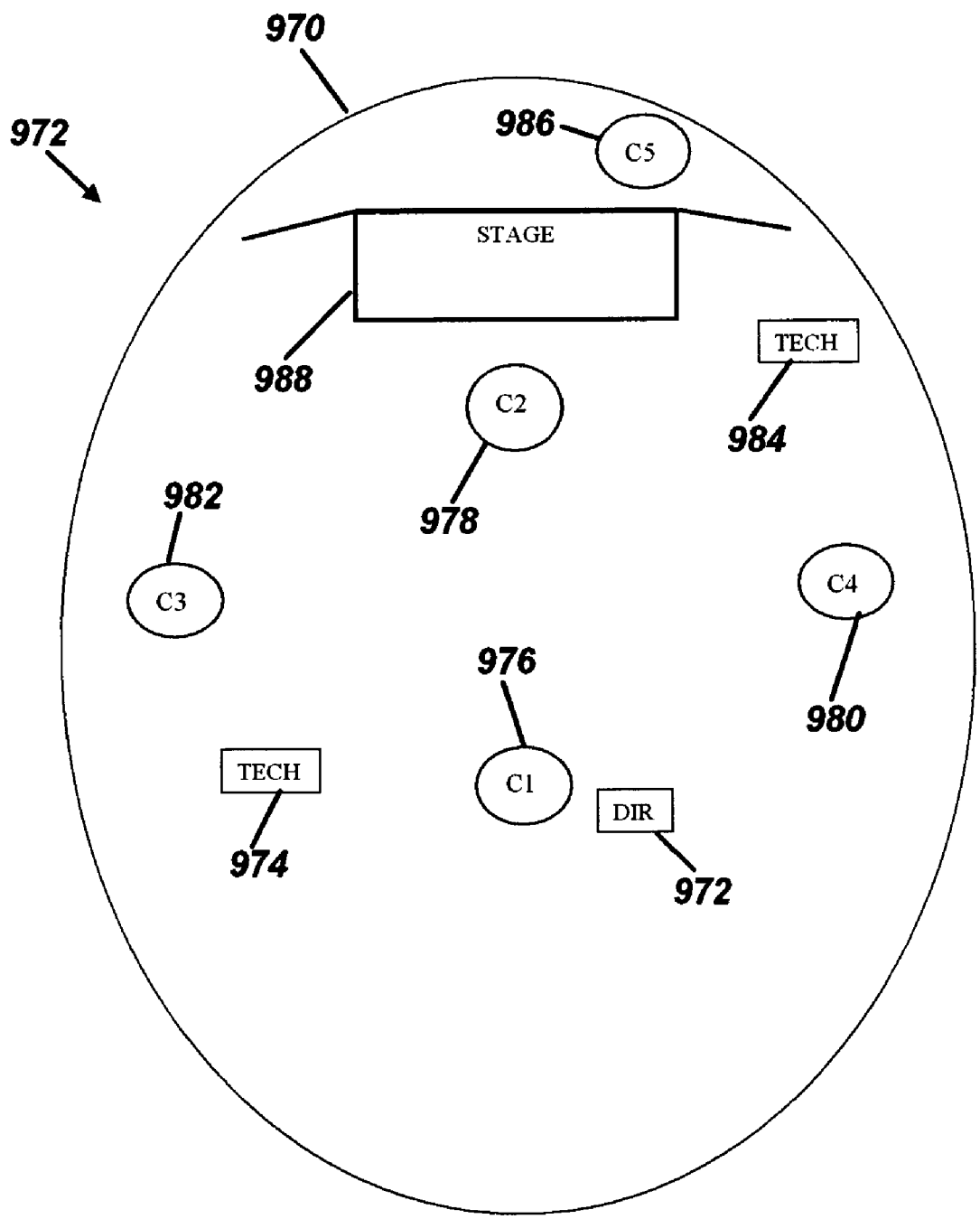
FIG. 27 illustrates a block diagram of a concert deployment, which may be implemented in accordance with an alternative embodiment of the present invention.

FIG. 27 illustrates a block diagram 972 of a concert deployment, which may be implemented in accordance with an alternative embodiment of the present invention. FIG. 27 depicts a concert arena 970, which includes a stage 988. A camera 976 (i.e., C1) can provide a main camera perspective. A camera 978 (i.e., C2) can provide close up perspectives of the events taking place on stage 988. Camera 982 (i.e., C3) can provide a left view of the events taking place on stage 988. Camera 980 (i.e., C4) can provide a right view of the events taking place on stage 988.

A backstage camera 986 (i.e., C5) can also provide backstage views of the events taking place on stage 988. A systems technician 974 (i.e., TECH) may also work in concert with a media/technical director 972 (i.e., DIR). Cameras C1 to C5 depicted in FIG. 27 thus generally can comprise in-play cameras. Video obtained from such in-play cameras can be transmitted from such in-play cameras for display at one or more hand held devices. The following generally summarizes the deployment illustrated in FIG. 27.

C1—Main Camera Perspective
C2—Close UP Perspectives
C3—Left View
C4—Right View
C5—Backstage Camera
TECH—System technicians
DIR—Media/Technical Director A hand held device (e.g., hand held device 60) can be equipped with receivers that can receive data transmitted from one or more data source(s) (e.g., RF gateways, video cameras, etc.) within the live entertainment venue. Such hand held devices are generally wireless-enabled and may take the form of a hand held portable television, PDA, proprietary rentals, or the like. The hand held devices may be adapted to receive smart cards, or the like, that can enable receipt of venue data (e.g., receivers and/or authorization codes being held within the smart card or module to enable signal decryption).

A venue-based data source can be a video camera, server or private broadcasting system. Video cameras can be adapted to provide high-resolution wide-angle video data. The video camera can also be a wireless video camera. It can be appreciated that a hand held device, as described herein, can also be configured to include video cameras which can record and broadcast video. In such a situation, the hand held device can actually function as an in-play camera (i.e., if the hand held device is configured with video camera and video transmission capabilities).

The concert arena or stadium can also be equipped with one or more transmitters. For example, several wireless gateways or signal transponders may be located throughout a venue to enable the simplex or duplex transfer of data. Examples of wireless networks that can be utilized in association with the present invention are the well-known local area "Bluetooth" and "802.11" networks, and telecommunications networks such as CDMA, W-CDMA, GSM, etc. It should be appreciated that remote viewers/devices that take advantage of in-play camera views can not only include venue-based hand held devices but can include distant monitors.

Figure 28:
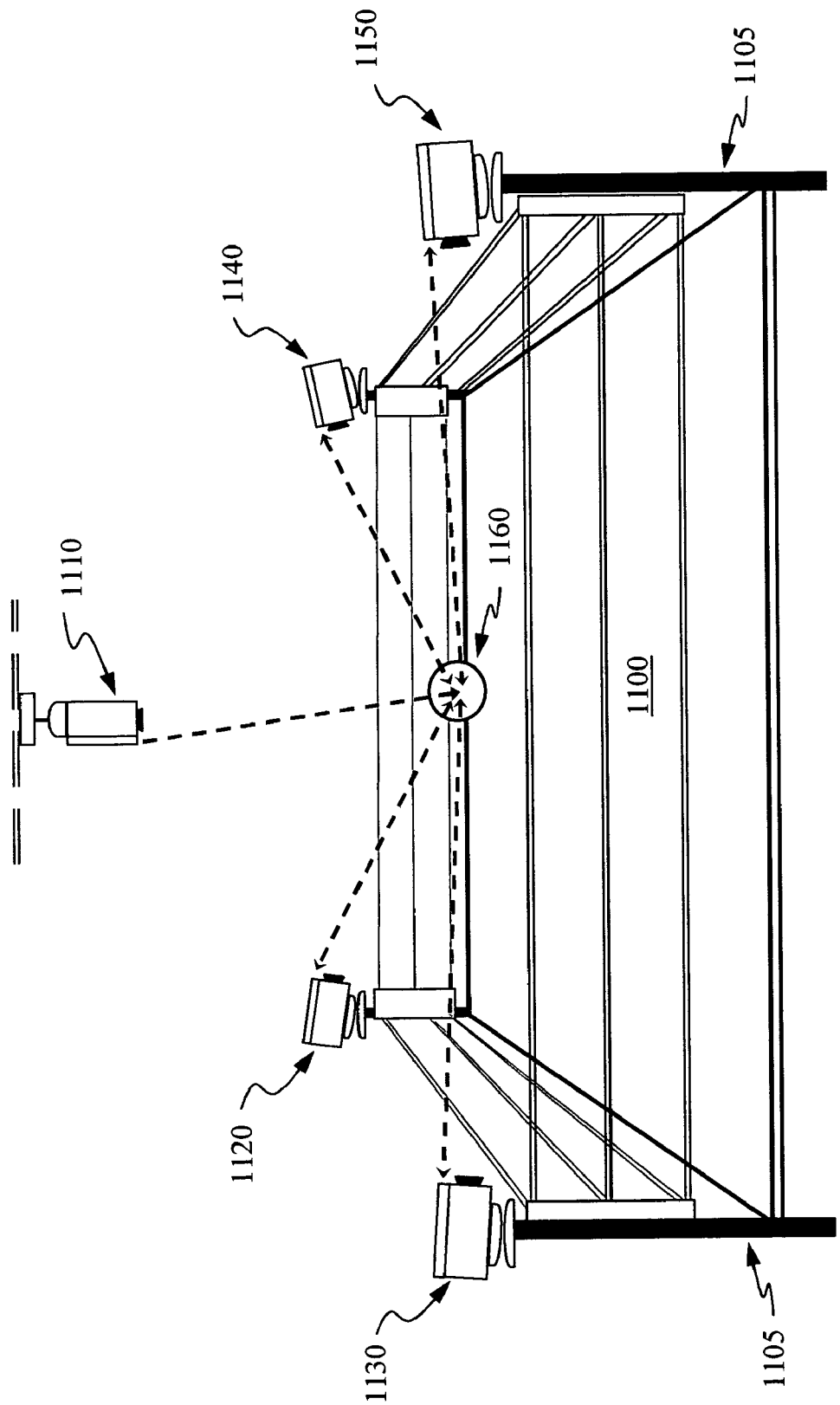
FIG. 28 illustrates a close-in environment deployment, which may be used for implementing systems and methods in accordance with an alternative embodiment of the present invention.

FIG. 28 illustrates a system in accordance with what has already been taught regarding the present invention, but for transmitting and displaying venue-based views from synchronized cameras 1110-1150 to/by remote viewers. Although FIG. 28 illustrates a contact sports arena 1100, such as a boxing or wresting ring, it should be appreciated that synchronized cameras 1110-1150 as thought herein can be deployed in a concert stage environment or other environments where the activity is close-in.

A synchronized camera system can include a main camera 1110 and at least one slave camera 1120-1150, wherein slave camera 1120-1150 movement depends on all movement by the main camera 110. Views captured by slave camera 1110-1150 are of the same general target area 1160 as those captured by the main camera. A synchronized camera system will typically be set up around a close-in activity area, such as a boxing ring, such that the main camera 1110 can provide an overall view of the entire close-in area. Main camera 1110 can thus be located proximate to an activity area such as an arena (e.g., boxing arena).

In FIG. 28, the main camera 1110 is shown deployed centered above the boxing ring 1100. The main camera will initially be set up by technicians to be focused dead center on in the close-in area. Slave cameras 1120-1150 will next be set up to be focused towards the same general area at the center of the ring as the main camera 1110. After initial set up, the main camera 1110 can be moved by remote control to several points around the environment, such as each corner of the boxing ring.

The slave cameras 1120-1150 would also move to each point that the main camera 110 is moved to. During movements of the main and slave cameras, a computer can tract x, y, z readings from each camera for each location. The process is continued until all cameras in the system are calibrated for synchronized movement to the same locations in the boxing ring. During operation, all slave cameras 1120-1150 can move around at the direction of the main camera 1110. Alternatively, the main camera 1110 and all slave cameras 1120-1150 can be moved around at the direction of an operator by remote control based on camera reading stored by the computer.

As an alternate embodiment, it can be appreciated by those skilled in the optical arts that technology now allows for system to coordinate movement based on optical tracking. If optical tracking is used for the synchronized camera system, then it should be appreciated that the main camera 1110 would likely transmit an optical light beam, such a laser beam, towards the target (e.g., boxers in a boxing ring). Slave camera movement would be based on movement of the optical beam sent by the main camera 1110. Slave camera 1120-1150 would include beam tracking technology, which can be provided in the form of a detector or image processing filter that would allow the slave cameras 1120-1150 to identify the light bean being transmitted by the main camera 1110. Use of beam tracking technology would overcome the need for calibration as previously described; however, movement of all cameras will always dependent on the main cameras.

As another alternate embodiment, is can be appreciated by those skilled in the radio frequency tagging art that RF tagging technology can be used to control the movement of synchronized cameras in a close-in environment, such as a boxing ring. With RF tagging, RF tags can be assigned to each boxer for placement in a non-inhibiting manner. Given the advances in the RF tag art, RF tags are so small that one or more RF tags could be placed on a boxer's belt, glove, shoe, or even a mouthpiece. The RF tags can be placed on both boxers and transmit the same or different signals for each respective boxer. Main and slave cameras can include RF tag detectors that are adapted to detect the RF tags and track the signal during movement. Camera can be split between boxers so that each boxer's image is captured during movement in the boxing ring. The RF receivers would sense signal strength and direction and move to the general area in the environment 100 of assigned RF signal transmission.

Alternatively, a grid of receivers can be deployed beneath the floor of the environment to track the strongest broadcast of RF tag signals above the floor. Information regarding signal strength and associated location can be managed by a server or computer in control of the cameras x, y, z orientation, or each camera can have on-board receivers and controllers that can electromechanically adjust the argument of each cameras based on received signal data.

Figures 29, 30:
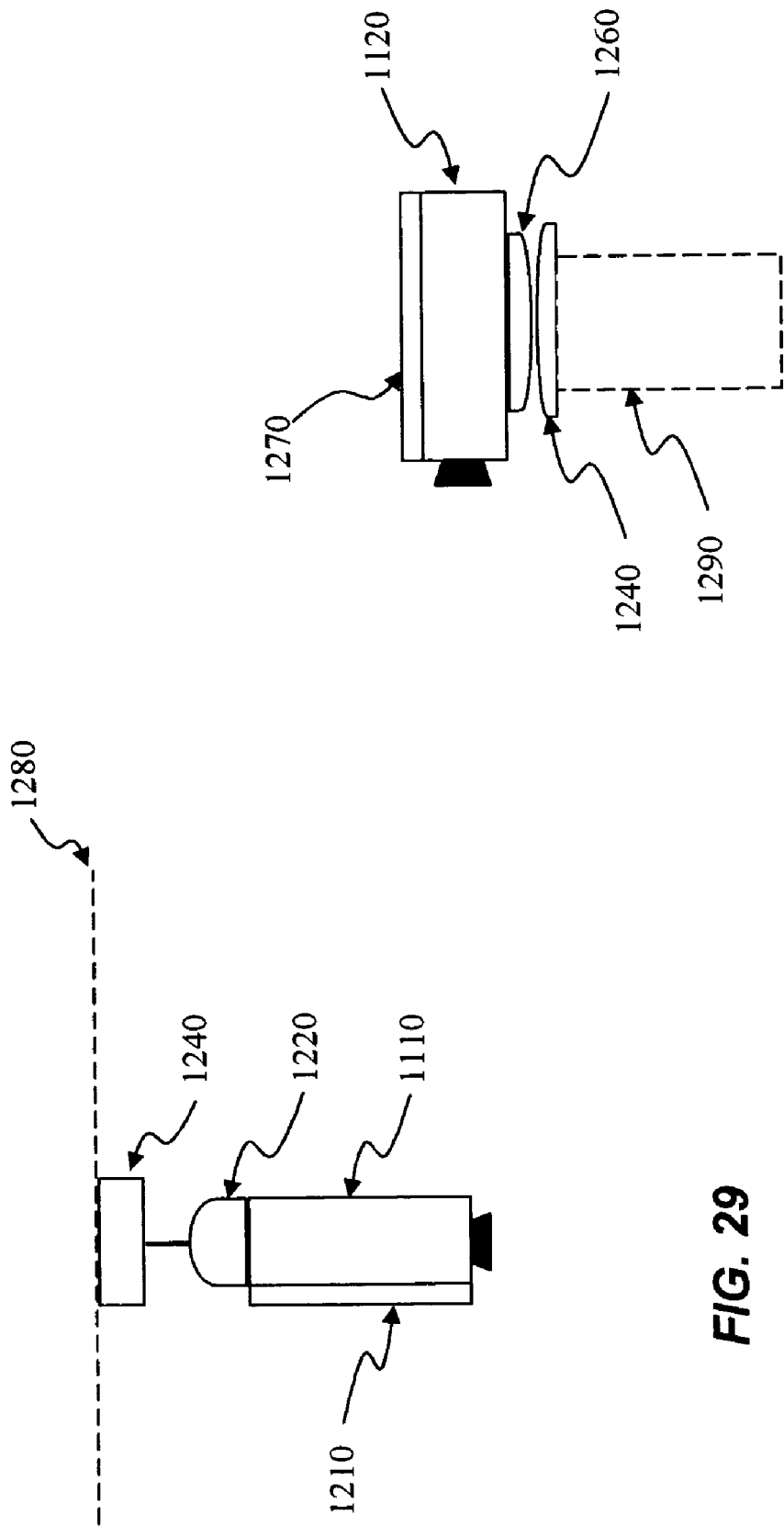
FIG. 29 illustrates a block a synchronized camera, which may be implemented in accordance with an alternative embodiment of the present invention.
FIG. 30 illustrates a synchronized slave camera, which may be implemented in accordance with an alternative embodiment of the present invention.

Referring to FIG. 29, illustrated a close up illustration of a main camera 1110 such as shown in FIG. 28. The main camera 1110 in FIG. 29 is shown mounted above the activity environment 1100 to overhead structural support or furnishings 1290 belonging to the venue, although it should be appreciated that a temporary support erected above the arena could also be utilized in accordance with particular embodiments. The camera 1110 can be mounted utilizing mounting hardware 1240. Electrometrical manipulation of the camera's x and y orientation can be provided by electromechanical hardware 1210 located between the mounting hardware 1240 and the camera 1110. Complimentary electronics and/or optics can be coupled to the camera for providing specialized capabilities such as laser beam transmission (e.g., used for optical tracking feature), Ref tag detection, wireless RF communications with remote systems (e.g., other cameras, enterprise IT equipment, or directly to remote viewers located within the venue such as hand held wireless devices held by venue attendees).

Referring to FIG. 30, illustrated a close up illustration of a slave camera 1120 such as shown in FIG. 29. The slave camera 1120 in FIG. 30 is shown mounted near the activity environment 1100 to structural support or furnishings 1290 belonging to the venue, although it should be appreciated that temporary support structures can be erected in the arena near the activity environment 1100 could also be used. The camera 1120 is mounted using mounting hardware 1240. Electrometrical manipulation of the camera's x and z orientation is provided by electromechanically hardware 1260 located between the mounting hardware 1240 and the camera 1120. Complimentary electronics and/or optics can be coupled to the camera for providing specialized capabilities such as laser beam detection (e.g., such as digital imaging used for laser beam optical tracking feature), RF tag detection, wireless RF communications with remote systems (e.g., other cameras, enterprise IT equipment, or directly to remote viewers located within the venue such as hand held wireless devices held by venue attendees).

Figure 31:
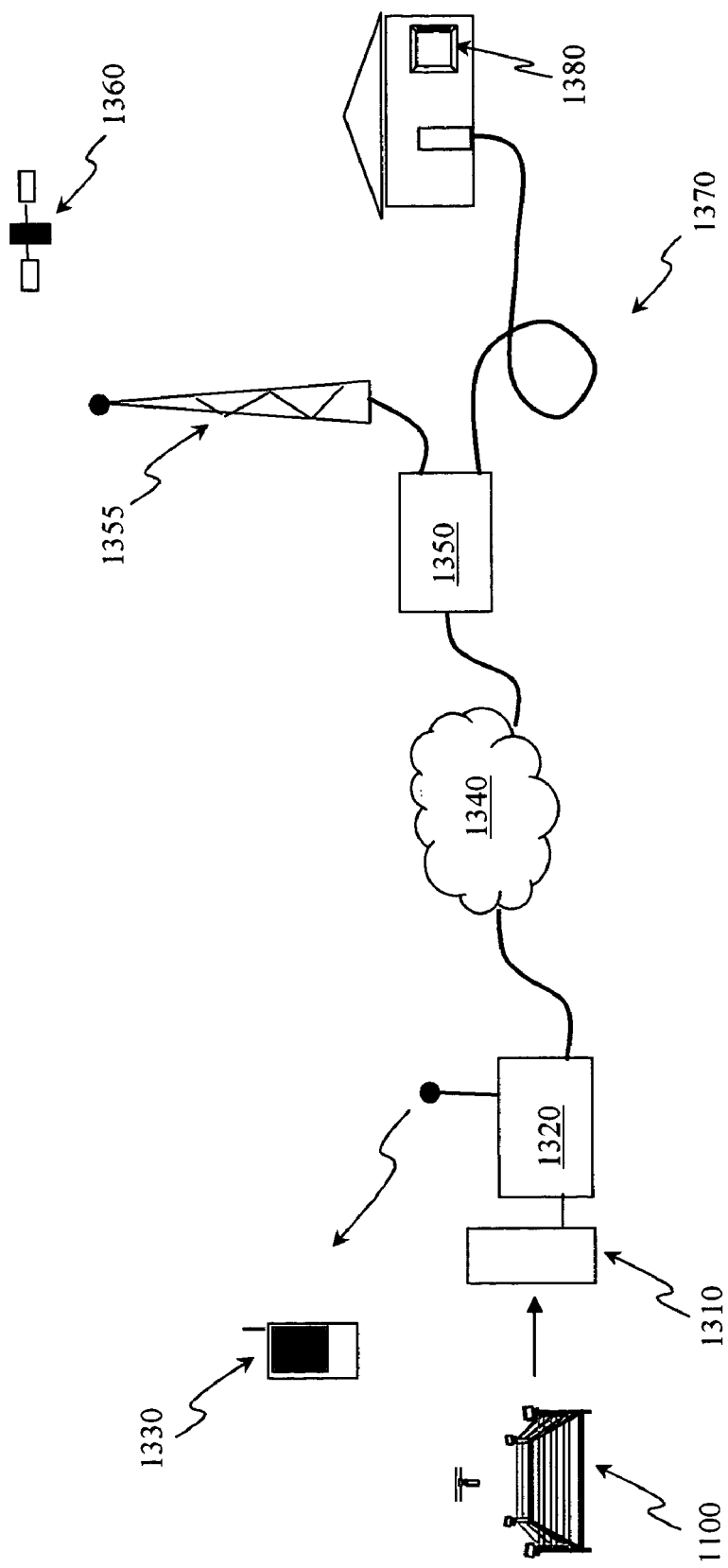
FIG. 31 is a schematic flow diagram of various broadcasting means that can be used to transmit synchronized and in-play camera views to remote viewers, which may be implemented in accordance with an alternative embodiment of the present invention.

It should be appreciated that remote viewers/devices that take advantage of synchronized camera views can not only include venue-based hand held devices but can include distant monitors such as high definition television (HDTV) systems, or other digital enabled viewing systems and devices used for entertainment purposes. Referring to FIG. 31 Camera views can be captured by more than synchronized camera deployed about and/or surrounding a close-in activity arena 1100, such as a boxing or wresting ring. Camera views can be provided from the synchronized cameras to a venue based router 1310. Thereafter, the camera views can be processed in a server 1320 for broadcast to remote viewers.

Remote viewers can include hand held devices 1330 and digital entertainment monitors 1380 (e.g., HDTV). Within a venue, the camera views can be processed and formatted for display on display screens associated with venue-based hand held device 1330. A user can select from more than one view provided from the synchronized camera system that the user wants displayed on the handheld device 1330, thereby enabling a user of the remote viewer to view more than one camera view, one at a time or simultaneously. The camera views can be transmitted from at least one camera to the hand held device in response to a user input and/or selection as described in detail hereinbefore. In addition, a particular camera view transmitted from at least one camera can be digital recorded by an enterprise system for instant replay, by the enterprise system or at the handheld device 1330 in response to a user input at the remote viewer.

As further shown in FIG. 31, broadcast of synchronized camera views, as well as in-play camera views, can be carried out in the venue from the server 1320 using wireless RF transmissions. Examples of wireless RF transmissions include digital WiFi utilizing wireless access points, digital cellular-subscriber transmission, and/or analog broadcasts.

Note that "WiFi" is an acronym for the term Wireless Fidelity. WiFi is known as wireless local area network operating generally in a license free ISM 2.4 GHz band. This network is generally defined by the standard IEEE 802.11 of indoor wireless LANs. WiFi essentially refers to a compatibility and interoperability between different devices and systems that are able to pass appropriate tests. Devices in a WiFi network can communicate within a wireless cell with a radius of, for example, approximately 150 meters in free space. Bandwidth available on a channel can be shared by all stations within a wireless cell. WiFi networks are ideal for high speed access to the Internet via public places referred to as "wireless hotspots". Devices that are based on the IEEE 802.11b standard, for example, can also be adapted for use in outdoor applications. With a higher output power and one or more associated external antennas, the range of WiFi network can be extended up to several kilometers.

Data representing multi synchronized or in-play camera views can also be transmitted through a network 1340 for further processing by subscription services (e.g., digital cable television and satellite television providers). Thereafter, multiple camera view data can be transmitted wirelessly 1355, via satellite 1360 or via cable 1370 to a subscriber's remote viewer 1380 in the form of a digital entertainment device (e.g., HDTV).

Methods and systems for transmitting and displaying venue-based synchronized camera views for live venue activities to remote views are therefore disclosed herein, with respect to particular embodiments. The synchronized camera can include a main camera and at least one slave camera, such that the movement of the slave camera is dependent on movement by the main or primary camera. View(s) captured by the slave camera are of the same general target as those captured by the main camera. Remote viewers can be venue-based hand held devices or distant monitors. Camera views can be captured by more than synchronized camera deployed around a contact sports arena, such as a boxing or wresting ring. Camera views can be provided from the synchronized cameras to a venue based server where the camera views are processed for broadcast to remote viewers. Remote viewers can include hand held devices and digital entertainment monitors (e.g., HDTV).

Within a venue, the camera views can be processed and formatted for display on display screens associated with venue-based hand held device. A user can select from more than one view from the synchronized camera that the user wants displayed on the remote viewer, thereby enabling a user of the hand held device to view more than one camera view, at a time or simultaneously, through the remote viewer. The in-play camera view can be transmitted from at least one camera to the hand held device in response to a user input and/or selection. In addition, a particular in-play camera view transmitted from at least one camera can be digital recorded by an enterprise system for instant replays or in response to a user input at the remote viewer.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A method for capturing, transmitting and processing arena camera views in an entertainment arena as video entertainment offered to customers located within the entertainment venue and remote customers located away from the entertainment venue, said camera views provided over a data network for display on a display screen associated with at least one remote viewer used by a customer, said method comprising the steps of:
providing a performance platform as a focal point for live entertainment occurring before a live audience within said entertainment venue;
simultaneously capturing at least two arena camera views of a live entertainment activity in an arena using a primary camera located above and near the center of said performance platform and capturing images of live entertainment occurring on said performance platform from above said performance platform and at least one slave camera located proximate to the performance platform and capturing side views of images on said platform, wherein movement of the at least one slave camera is synchronized to movement of the primary camera enabling the primary camera and the at least one slave camera to remain focused on a similar target of interest in the arena and moving about said performance platform while simultaneously capturing the at least two arena camera views;
transmitting said at least two arena camera views provided from the primary camera and the at least one slave camera to a server connected to said data network;
processing said at least two arena camera views at said server for display on a display screen associated with at least one remote viewer; and
enabling display of at least one arena camera view on a display screen associated with at least one remote viewer in response to user selection of said at least one arena camera view from said at least two arena camera views at the at least one remote viewer, thereby enabling a user of the at least one remote viewer to view the at least one arena camera view through said display screen associated with the remote viewer.

2. The method of claim 1 further comprising the step of configuring said primary camera and said at least one slave camera using a computer to enable movement of said at least one slave camera that is dependent on movement of said primary camera.

3. The method of claim 1 wherein the at least one remote viewer comprises a hand held device.

4. The method of claim 1 wherein the at least one remote viewer comprises a digital entertainment device.

5. The method of claim 1 further comprising the step of recording said at least one arena camera view in a memory associated with the at least one remote viewer in response to user input at the at least one remote viewer.

6. The method of claim 5 wherein said memory location comprises storage media.

7. The method of claim 5 wherein said at least one arena camera view comprises an instant replay.

8. The method of claim 1 further comprising the step of transmitting said at least one arena camera view from said server to the at least one remote viewer for display on said display screen associated with the at least one remote viewer, wherein transmission of the at least one arena camera view from said is through a wireless communications network associated with said data network.

9. The method of claim 1 further comprising the step of transmitting said at least one arena camera view from said server to the at least one remote viewer for display on said display screen associated with the at least one remote viewer, wherein transmission of the at least one arena camera view from said server is through a data communications network associated with said server.

10. The method of claim 8 wherein said wireless communications network further comprises a satellite communications network.

11. The method of claim 9 wherein said data communications network comprises a digital cable television network.

12. The method of claim 1 wherein said performance platform comprises at least one of: a boxing arena, a wrestling arena, a football arena, a basketball arena, a concert venue.

13. The method of claim 2 wherein said performance platform within said arena comprises at least one of: a boxing ring, a wrestling ring, a concert stage.

14. The method of claim 5 wherein said arena comprises at least one of: a boxing ring, a wrestling ring, a football field, a basketball court, a concert stage.

15. The method of claim 8 wherein said arena comprises at least one of: a boxing ring, a wrestling ring, a football field, a basketball court, a concert stage.

16. The method of claim 9 wherein said arena comprises at least one of: a boxing ring, a wrestling ring, a football field, a basketball court, a concert stage.

17. The method of claim 1 wherein said arena comprises a sports venue.

18. The method of claim 1 further comprising the step of associating one primary camera with more than one synchronized camera.

19. The method of claim 1 further comprising the step of configuring said at least one primary camera to comprise at least on RF tag detector that is adapted to detect the location and direction of at least one RF tag associated with a target performing within said arena and wherein movement of said at least one slave camera is synchronized to movement of the primary camera based upon movement of said RF tag and the target.

20. The method of claim 2 further comprising the steps of:
locating a laser source at said at least one primary camera;
transmitting a laser beam from said laser source towards a moving target within said arena;
associating a laser light detector with said at least one slave camera, wherein said laser light detector identifies termination of a laser beam emanating from said laser source where the laser beam impinges on the moving target; and
automatically tracking the moving target within said arena based on the identification of the termination of the laser beam on the moving target via said laser light detector.

21. A system for processing and transmitting over a communications network more than one video perspective provided by synchronized cameras simultaneously capturing multiple views of an entertainment activity being performed on a performance platform located in an five entertainment arena for display at remote viewers held by customers located within the entertainment venue and remote customers located away from the entertainment venue, said camera views provided over a data network, said system comprising:

a performance platform provided as a focal point for live entertainment occurring before a live audience within said entertainment venue;

synchronized cameras including a primary camera located above and near the center of said performance platform and capturing images of live entertainment occurring on said performance platform from above said performance platform and at least one slave camera located proximate to the performance platform for capturing side views of entertainment occurring on said platform, wherein the more than one video perspective of entertainment activity can be transmitted from said synchronized cameras to a server connected to a data communications network, said server for processing the more than one video perspective of entertainment activity for display on a display screen associated with at least one remote viewer; and a data communications network for transmitting the more than one video perspective of entertainment activity to at least one remote viewer for selective display of the more than one video perspective of entertainment activity on a display screen associated with said at least one remote viewer.

22. The system of claim 21 wherein movement of said at least one slave camera is dependent on a movement by said primary camera.

23. The system of claim 21 further comprising at least one remote viewer, wherein said at least one remote viewer comprises a hand held device.

24. The system of claim 21 further comprising at least one remote viewer, wherein said at least one remote viewer comprises a digital entertainment device.

25. The system of claim 21 further comprising a controller for transmitting the more than one video perspective of entertainment activity from said server to said at least one remote viewer in response to a request from an authorized user at said at least one remote viewer.

26. The system of claim 25 wherein said request is provided to said server following user input at said at least one remote viewer.

27. The system of claim 21 further comprising said at least one remote viewer further comprising a recorder for recording the more than one video perspective of entertainment activity for replay at said at least one remote viewer.

28. The system of claim 21 said server further comprising a memory for storing the more than one video perspective of entertainment activity captured by the synchronized cameras in the arena, wherein the more than one video perspective of entertainment activity is accessible as recorded video data from the memory for selective display at said at least one remote viewer.

29. The system of claim 28 wherein said recorded video data comprises an instant replay.

30. The system of claim 21 further comprising a communications module for transmitting the more than one video perspective of entertainment activity to remote viewers provided in the form of hand held devices located at the arena for display of the more than one video perspective of entertainment activity on said display screen associated with said at least one remote viewer.

31. The system of claim 30 further comprising a wireless transmission module for communicating the more than one video perspective of entertainment activity from said server through a cellular communications system and network to the remote viewers for selective display of the more than one video perspective of entertainment activity on a display screen associated with said remote viewers.

32. The system of claim 21 further comprising a communications network associated with said server, wherein the more than one video perspective of entertainment activity is communicated from said server through said communications network for display on a display screen associated with said remote viewers.

33. The system of claim 32 wherein said communications network comprises a satellite communications network.

34. The system of claim 32 wherein said communications network comprises a digital cable television network.

35. The system of claim 21 wherein said arena comprises at least one of: a boxing ring, a wrestling ring, a football field, a basketball court, a concert stage.

36. The system of claim 25 wherein said arena comprises at least one of: a boxing ring, a wrestling ring, a football field, a basketball court, a concert stage.

37. The system of claim 27 wherein said arena comprises at least one of: a boxing ring, a wrestling ring, a football field, a basketball court, a concert stage.

38. The system of claim 28 wherein said arena comprises at least one of: a boxing ring, a wrestling ring, a football field, a basketball court, a concert stage.

39. The system of claim 30 wherein said arena comprises at least one of: a boxing ring, a wrestling ring, a football field, a basketball court, a concert stage.

40. The system of claim 31 wherein said arena comprises at least one of: a boxing ring, a wrestling ring, a football field, a basketball court, a concert stage.

41. The system of claim 32 wherein said arena comprises at least one of: a boxing ring, a wrestling ring, a football field, a basketball court, a concert stage.

42. The system of claim 22 further comprising at least one in-play camera.

43. The system of claim 21 further comprising at least one in-play camera associated with a participant moving within said arena.

44. The system of claim 21 wherein said at least one primary camera comprises at least on RF tag detector adapted to detect at least one RF tag associated with a participant moving within said arena.

45. The system of claim 21 wherein said at least one slave camera comprises at least on RF tag detector adapted to detect at least one RF tag associated with a participant moving within said arena.

46. The system of claim 44 further comprising a tracking module for tracking said participant utilizing said at least one RF tag associated with said participant moving within said arena.

47. The system of claim 21 further comprising:

a laser source located at said primary camera, wherein an optical light beam is transmittable from said laser source towards a performer within said arena;

a laser light detector associated with said at least one slave camera, wherein said laser light detector identifies termination of a laser beam emanating from said laser source where the laser beam impinges on the performer; and a tracking module for automatically tracking the moving target within said arena based on the identification of the termination of the laser beam on the performer via said laser light detector.

48. A system for transmitting more than one video perspective provided by synchronized cameras simultaneously capturing multiple views of an entertainment activity at an arena for display on a display screen associated with at least one hand held device located in the arena, said system comprising:
- a performance platform including at least one of a boxing ring, a wrestling ring, a football field, a basketball court, and a concert stage, said performance platform provided as a focal point for live entertainment occurring before a live audience within said entertainment venue;
- synchronized cameras including a primary camera located above and near the center of said performance platform and capturing images of live entertainment occurring on said performance platform from above said performance platform and at least one slave camera located proximate to the performance platform for capturing side views of entertainment occurring on said platform, wherein the more than one video perspective of entertainment activity can be transmitted from said synchronized cameras to a server connected to a data communications network, said server for processing the more than one video perspective of entertainment activity for display on a display screen associated with at least one hand held device physically located in the arena; and
- a data communications network associated with said server, wherein the more than one video perspective of entertainment activity can be communicated from said server through said data communications network to said at least one and held device;
- wherein the more than one video perspective of entertainment activity is displayed on said at least one display screen in response to a user selection at the at least one hand held device, thereby enabling a user of said at least one hand held device to view at least one of the more than one video perspective of entertainment activity through said at least one hand held device.

49. The system of claim 48 wherein said communications network comprises a wireless communications network.

50. The system of claim 48 wherein said communications network comprises a satellite communications network.

51. The system of claim 48 wherein said communications network comprises a digital cable television network.

52. The system of claim 48 said at least one hand held device further comprising a recorder for recording the more than one video perspective of entertainment activity for replay at the hand held device.

53. The system of claim 48 said server further comprising a memory for storing the more than one video perspective of entertainment activity captured by the synchronized cameras in the arena, wherein the more than one video perspective of entertainment activity is accessible as recorded video data from the memory for selective display at said at least one hand held device.

54. The system of claim 53 wherein said recorded video data comprises an instant replay.

55. The system of claim 48 further comprising a wireless transmission module for communicating the more than one video perspective of entertainment activity from said server through a cellular communications system and network to the remote viewers for selective display of the more than one video perspective of entertainment activity on said hand held devices.

56. The system of claim 48 further comprising a WiFi communications network associated with said server, wherein the more than one video perspective of entertainment activity is communicated from said server through said WiFi communications network for display on said hand held devices.

57. The system of claim 48 further comprising at least one in-play camera.

58. The system of claim 48 further comprising at least one in-play camera associated with a participant moving within said arena.

59. The system of claim 48 wherein said at least one primary camera comprises at least on RF tag detector adapted to detect at least one RF tag associated with a participant moving within said arena.

60. The system of claim 48 wherein said at least one slave camera comprises at least on RF tag detector adapted to detect at least one RF tag associated with a participant moving within said arena.

61. The system of claim 55 wherein said arena comprises at least one of: a boxing arena, a wrestling arena, a football arena, a basketball arena, a racing venue, a concert venue.

62. The system of claim 56 wherein said arena comprises at least one of: a boxing arena, a wrestling arena, a football arena, a basketball arena, a racing venue, a concert venue.

* * * * *